US011353888B2

(12) United States Patent
Iyer

(10) Patent No.: US 11,353,888 B2
(45) Date of Patent: Jun. 7, 2022

(54) SYSTEM AND METHOD FOR DETERMINING OPTIMAL FLIGHT PATH AROUND WEATHER VORTICES

(71) Applicant: Rockwell Collins, Inc., Cedar Rapids, IA (US)

(72) Inventor: Narayan R. Iyer, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 379 days.

(21) Appl. No.: 16/271,688

(22) Filed: Feb. 8, 2019

(65) Prior Publication Data

US 2020/0257316 A1      Aug. 13, 2020

(51) Int. Cl.
*G01W 1/02* (2006.01)
*G05D 1/10* (2006.01)
*G01C 23/00* (2006.01)
*G01W 1/00* (2006.01)

(52) U.S. Cl.
CPC ........... *G05D 1/101* (2013.01); *G01C 23/005* (2013.01); *G01W 1/02* (2013.01); *G01W 2001/003* (2013.01)

(58) Field of Classification Search
CPC ....... G05D 1/101; G01C 23/005; G01W 1/02; G01W 2001/003
See application file for complete search history.

(56) References Cited

U.S. PATENT DOCUMENTS

| 6,266,610 | B1* | 7/2001 | Schultz | G08G 5/0034 |
| | | | | 701/528 |
| 6,600,991 | B1* | 7/2003 | Jardin | G01C 21/00 |
| | | | | 342/26 R |
| 10,202,190 | B2* | 2/2019 | Tao | G08G 5/006 |
| 2014/0074766 | A1* | 3/2014 | Aristoff | G06N 5/02 |
| | | | | 706/52 |

(Continued)

FOREIGN PATENT DOCUMENTS

WO      0040929 A1    7/2000

OTHER PUBLICATIONS

Extended Search Report dated Jun. 12, 2020 for EP Application No. 19212832.

(Continued)

*Primary Examiner* — Peter D Nolan
*Assistant Examiner* — Roy Rhee
(74) *Attorney, Agent, or Firm* — Suiter Swantz pc llo

(57) ABSTRACT

A system for an aircraft includes a user interface device and a controller. The controller is configured to receive a present location of the aircraft, a present location of one or more wind vortices, a strength of the one or more wind vortices, and a desired ending point of the aircraft. The desired ending point of the aircraft is received from the user interface device. The controller is configured to define an optimization problem, and determine a solution to the optimization problem. The solution to the optimization problem includes a flight path and steering angle values to achieve the flight path. The flight path results in a minimum time to reach the desired ending point. The controller is configured to cause the user interface device to display a map including the flight path.

15 Claims, 16 Drawing Sheets

(56) References Cited

U.S. PATENT DOCUMENTS

2019/0035298 A1* 1/2019 Rhodes .................. G05D 1/105

OTHER PUBLICATIONS

Lolla, Tapovan et al., "Time-optimal path planning in dynamic flows using level set equations: theory and schemes", Ocean Dynamics, vol. 64, No. 10, Sep. 4, 2014, pp. 1373-1397.
Li, B., Xu, C., Teo, K. L., and Chu, J., "Time Optimal Zermelo's Navigation Problem with Moving and Fixed Obstacles," Applied Mathematics and Computation, pp. 866-875.
Matthew R. Jardin and Arthur E. Bryson, "Neighboring Optimal Aircraft Guidance in Winds", Journal of Guidance, Control, and Dynamlcs 2001 24:4, 710-715.
Office Action dated Dec. 12, 2021 for EP Application No. 19212832, 6 pages.

* cited by examiner

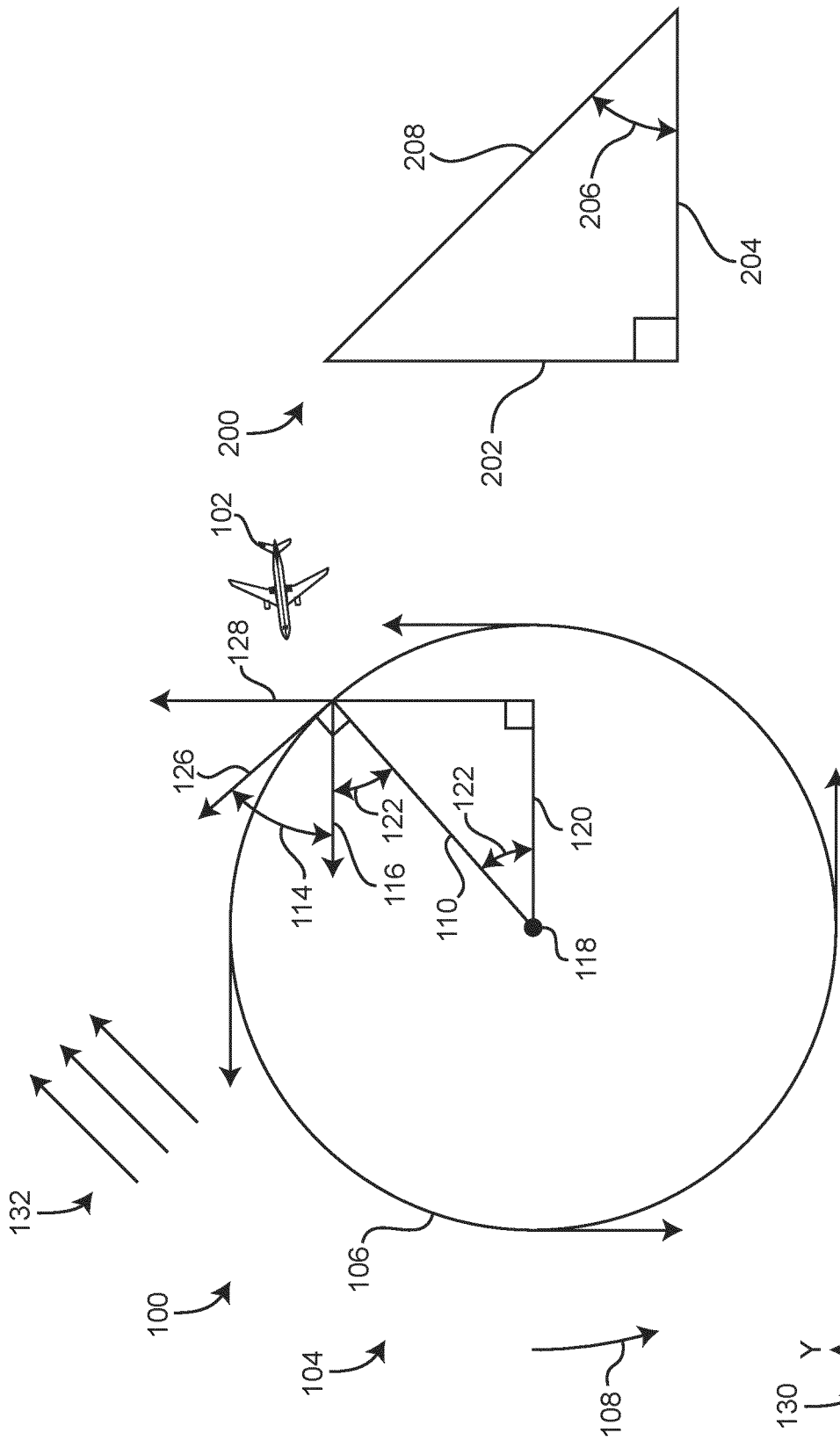

```
% Clear figure, command and workspace histories
close all; clear all; clc;
% Define parameters of the problem
%%%%%%%%%%%%%%%%%%%%%%%%%%%%%%%%%%%%%%%%%%
% MAKE SURE YOUR UNITS ARE CONSISTENT!!! %
%%%%%%%%%%%%%%%%%%%%%%%%%%%%%%%%%%%%%%%%%%

%-----------------------------------------------------------------------
%% Boundary Conditions                                              1402
%-----------------------------------------------------------------------
global x0 y0 xf yf V Hf % pass these BCs to the BC function
% Initial conditions
x0 - 0; % initial x coordinate
y0 - 4; % initial y coordinate
xf = 10; % final x coordinate
yf = 4; % final y coordinate
% Final conditions
Hf = -1; % final value of Hamiltonian
V = 1;
&----------------------------------------------------------------------
%% Initial Guesses                                                  1404
&---------------------------------------------------------------------- t0 = 0; % initial time
lambda10 = -1;
lambda20 = -1;

% list initial conditions in yinit, use zero if unknown
% guess for initial state and co-state variables:
yinit = [x0 y0 lambda10 lambda20];
% intial guess for final time (in seconds):

tf_guess = 10;
Nt = 50;
tau = linspace(0,1,Nt)'; % non-dimensional time vector
% Create an initial guess of the solution using the MATLAB function
% bvpinit, which requires as inputs the (non-dimensional) time vector,
% intial states (or guesses, as applicable), and the guess for the final
% time. The initial guess of the solution is stored in the structure
% solinit.
solinit - bvpinit(tau,yinit,tf_guess);
%----------------------------------------------------------------------
%% Solution                                                         1406
%----------------------------------------------------------------------
% Call bvp4c to solve the TPBVP. Point the solver to the functions
% containing the differential equations and the boundary conditions and
% provide it with the initial guess of the solution.
sol = bvp4c(@project_odes_tf, @project_bcs_tf, solinit);
% Extract the final Time from the solution:
tf = sol.parameters(1);
% Evaluate the solution at all times in the non-dimensional time vector tau
```

FIG. 11A

```
%ODES Function function dX_dtau = project_odes_tf(tau,X,tf)

% Note that the state vector X has components
% X(1) = x, horizontal component of position
% X(2) = y, vertical component of position
% X(3) = lambda_1
% X(4) = lambda_2

L1 = x(3);
L2 = x(4);

global V

& State and Co-state differential equations in terms of d/dt:
LBar = sqrt(L1^2+L2^2);
cosTheta = -L1/LBar;
sinTheta = -L2/LBar;

xdot = V*cosTheta + u(X(1),X(2),0);
ydot = V*sinTheta + v(X(1),X(2),0);
lambda_1_dot = - X(3)*u(X(1),X(2),1) - X(4)*v(X(1),X(2),1);
lambda_2_dot = - X(3)*u(X(1),X(2),-1) - X(4)*v(X(1),X(2),-1);
% Non-dimensionalize time (with tau = t/tf and d/dtau = tf*d/dt). We must
% multiply each differential equation by tf to convert our derivatives from
% d/dt to d/dtau.
dX_dtau = tf*[xdot; ydot; lambda_1_dot; lambda_2_dot];
return
```

FIG. 12

```
%Boundary Condition Function function PSI = project_bcs_tf(Y0,Yf,tf)
% pass in values of boundary conditions as global variables
global x0 y0 xf yf Hf V
% Create a column vector with the 8 boundary conditions on the state &
% co-state variables (the 9th boundary condition, t0 = 0, is not used).
% The last element in PSI is the final value of the Hamiltonian. Note that
% the Hamiltonian is:
% H = lambda_2*ydot + lambda_3*Vxdot + lambda_4*Vydot
% or:
% H = Yf(5)*Ydotf(2) + Yf(6)*Ydotf(3) + Yf(7)*Ydotf(4)
% where ydot, Vxdot, and Vydot at the final time are evaluated by the
% ascent_odes_tf function at tau = 1, X = Yf, and tf into the vector Ydotf:
Lbar = sqrt(Yf(3)^2 + Yf(4)^2);
cosT = -Yf(3)/Lbar;
sinT = -Yf(4)/Lbar;

PSI = [Y0(1) - x0; % Initial Condition
 Y0(2) - y0; % Initial Condition
 Yf(1) - xf; % Final Condition
 Yf(2) - yf; % Final Condition
 (Yf(3)*(V*cosT+u(xf,yf,0)) + Yf(4)*(V*sinT+v(xf,yf,0)))*tf+1];% Final
Condition
return
```

FIG. 13

```
% X winf velocity function                                          1700 function xvel = u(x,y,derivative)

c = 5;
    k = 5;
    Gamma = 5;%Vortex Strength;
    if (derivative == 0) %no derivative is seeked
        xvel = -(Gamma/(2*pi())).*(y-k)./((x-c).^2+(y-k).^2);
    elseif (derivative > 0) %x derivative is seeked
        xvel = (Gamma/(2*pi())).*(2.*(-c+x).*(-k+y))./((-c+x).^2+(-
k+y).^2).^2;
    elseif (derivative < 0) %y derivative is seeked
        xvel = -(Gamma/(2*pi())).*((-c+x).^2-(-k+y).^2)./((-c+x).^2+(-
k+y).^2).^2;
    else
        error('U is undetermined')
    end return % Y winf velocity function                                          1800 function yvel = u(x,y,derivative)

c = 5;
    k = 5;
    Gamma = 5;%Vortex Strength;
    if (derivative == 0) %no derivative is seeked
        yvel = (Gamma/(2*pi())).*(y-k)./((x-c).^2+(y-k).^2);
    elseif (derivative > 0) %x derivative is seeked
        yvel = (Gamma/(2*pi())).*(-(-c+x).^2+(+k+y).^2)/((-c+x).^2+(-
k+y).^2).^2;
    elseif (derivative < 0) %y derivative is seeked
        yvel = -(Gamma/(2*pi())).*(2.*(-c+x).*(-k+y))./((-c+x).^2+(-
k+y).^2).^2;
    else
        error('U is undetermined')
    end return
```

```
% The changes in main were as given below:

[x,y] = meshgrid(0:1:12,0:1:12);
xvel = u(x,y,0)+u2(x,y,0);
yvel = v(x,y,0)+v2(x,y,0);
quiver(x,y,xvel,yvel)
```

```
%ODES function was updated function dX_dtau = project_odes_tf(tau,X,tf)

% Note that the state vector X has components
% X(1) = x, horizontal component of position
% X(2) = y, vertical component of position
% X(3) = lambda_1
% X(4) = lambda_2

L1 = X(3);
L2 = X(4);

global V

% State and Co-state differential equations in terms of d/dt:
LBar = sqrt(L1^2+L2^2);
cosTheta = -L1/LBar;
sinTheta = -L2/LBar;

xdot = V*cosTheta + u(X(1),X(2),0) + u2(X(1),X(2),0);
ydot = V*sinTheta + v(X(1),X(2),0)+ v2(X(1),X(2),0);
lambda_1_dot = - X(3)*(u(X(1),X(2),1)+ u2(X(1),X(2),1)) -
X(4)*(v(X(1),X(2),1)+v2(X(1),X(2),1));
lambda_2_dot = - X(3)*(u(X(1),X(2),-1)+ u2(X(1),X(2),-1)) -
X(4)*(v(X(1),X(2),-1)+v2(X(1),X(2),-1));
% Non-dimensionalize time (with tau = t/tf and d/dtau = tf*d/dt). We must
% multiply each differential equation by tf to convert out derivatives from
% d/dt to d/dtau.
dX_dtau = tf*[xdot; ydot; lambda_1_dot; lambda_2_dot];
return
```

FIG. 16

```
%Two new speed functions were implemented:

function xvel = u2(x,y,derivative)

c = 8;
    k = 5;
    Gamma = 5;%Vortex Strength;
    if (derivative == 0) %no derivative is seeked
        xvel = (Gamma/(2*pi())).*(y-k)./((x-c).^2+(y-k).^2);
    elseif (derivative > 0) %x derivative is seeked
        xvel = -(Gamma/(2*pi())).^(2.*(-c+x).*(-k+y))./((-c+x).^2+(-k+y).^2).^2;
    elseif (derivative < 0) %y derivative is seeked
        xvel = (Gamma/(2*pi())).*((-c+x).^2-(-k+y).^2)./((-c+x).^2+(-k+y).^2).^2;
    else
        error('U is undetermined')
    end return
```

2100

```
%and function yvel = v2(x,y,derivative)

c = 8;
    k = 5;
    Gamma = 5;%Vortex Strength;
    if (derivative == 0) %no derivative is seeked
        yvel = -(Gamma/(2*pi())).*(x-c)./((x-c).^2+(y-k).^2);
    elseif (derivative > 0) %x derivative is seeked
        yvel = -(Gamma/(2*pi())).*(-(-c+x).^2+(-k+y).^2)/((-c+x).^2+(-k+y).^2).^2;
    elseif (derivative < 0) %y derivative is seeked
        yvel = (Gamma/(2*pi())).*(2.*(-c+x).*(-k+y))./((-c+x).^2+(-k+y).^2).^2;
    else
        error('U is undetermined')
    end return
```

2200

FIG. 17

SYSTEM AND METHOD FOR DETERMINING OPTIMAL FLIGHT PATH AROUND WEATHER VORTICES

BACKGROUND

The present disclosure relates generally to the field of avionics. More specifically, the present disclosure relates to systems and methods for determining flight paths to avoid weather vortices (e.g., wind vortices).

Wind vortices can be produced as a result of wind patterns, storms, hurricanes, tornadoes, etc. Typically, wind vortices can cause aircrafts to be blown off course since they present the pilot and the avionic systems of the aircraft with a complex problem. The flight path as determined by some flight management systems may simply avoid the storm cells altogether, thereby increasing travel time. Increasing travel time by avoiding storm cells can decrease flight efficiency and increase costs associated with flights. On some occasions, pilots may judgmentally determine a route to take to avoid storm cells and may attempt to use vortex currents to speed up the aircrafts. However, the judgment of the pilot is prone to error and this may result in the aircraft being blown significantly off course, thereby increasing flight time. Additionally, flying through headwinds can increase flight time. Some pilots may attempt to use tailwinds to help decrease flight time and fuel consumption, however, this is largely judgmental. Flying too close to an eye of a vortex or a storm cell causes strong side/cross winds that can cause the aircraft so spend extra time and consume more fuel to compensate for the cross winds. However, flying too far from the eye of the vortex or storm cell results in a large deviation from the original flight path and results in the aircraft catching weak tailwinds despite the opportunity for the aircraft to catch stronger tailwinds. There is a need for a system to determine a flight path which avoids storm cells yet uses vortex currents when possible to catch tailwinds such that flight time and fuel consumption of the aircraft are minimized.

SUMMARY

In one aspect, the inventive concepts disclosed herein are directed to a controller for an aircraft. In some embodiments, the controller is configured to receive a starting point, a desired ending point, an initial time, a current aircraft speed, a wind vortex strength, and a wind vortex position. In some embodiments, the controller is configured to determine components of wind speed of at least one of the wind vortex, a wind source, and a uni-directional wind. In some embodiments, the controller is configured to determine one or more boundary conditions for a boundary value optimization problem. In some embodiments, the controller is configured to determine an initial estimate for the boundary value optimization problem, define the boundary value optimization problem as one or more differential equations based on the starting point, the desired ending point, the initial time, the current aircraft speed, the components of the wind speed, and a control variable of the aircraft. In some embodiments, the controller is configured to determine a solution for the boundary value optimization problem based on the one or more boundary conditions, the one or more differential equations and the initial estimate. In some embodiments, the controller is configured to evaluate the solution to determine a flight path and control variable values for the flight path. In some embodiments, the controller is configured to at least one of provide a display representing the determined flight path and the control variable values to a user, and adjust an operation of the aircraft to use the control variable values to follow the determined flight path.

In a further aspect, embodiments of the inventive concepts disclosed herein are directed to a method for determining a flight path around a wind vortex and controlling an aircraft to follow the flight path. In some embodiments, the method includes receiving a starting point, a desired ending point, an initial time, and a current aircraft speed. In some embodiments, the method also includes determining components of wind speed of a wind vortex. In some embodiments, the method also includes determining one or more boundary conditions for an optimization problem. In some embodiments the method also includes determining an initial estimate for the optimization problem. In some embodiments, the method includes defining the optimization problem as one or more differential equations based on the starting point, the desired ending point, the initial time, the current aircraft speed, the components of the wind speed, and a control variable of the aircraft. In some embodiments, the method also includes determining a solution for the boundary value optimization problem based on the one or more boundary conditions, the one or more differential equations, and the initial estimate. In some embodiments, the method also includes evaluating the solution to determine a flight path and control variable values for the flight path. In some embodiments, the method also includes adjusting an operation of the control variable of the aircraft to cause the aircraft to follow the determined flight path.

In still further aspect, embodiments of the inventive concepts disclosed herein are directed to an avionic system for an aircraft. In some embodiments, the system includes a user interface device and a controller. In some embodiments, the controller is configured to receive a present location of the aircraft, a present location of one or more wind vortices, a strength of the one or more wind vortices, and a desired ending point of the aircraft. In some embodiments, the desired ending point of the aircraft is received from the user interface device. In some embodiments, the controller is configured to define an optimization problem, and determine a solution to the optimization problem. In some embodiments, the solution to the optimization problem includes a flight path and steering angle values to achieve the flight path. In some embodiments, the flight path results in a minimum time to reach the desired ending point. In some embodiments, the controller is configured to cause the user interface device to display a map including the flight path.

BRIEF DESCRIPTION OF THE DRAWINGS

A portion of the disclosure of this patent document (including the Figures) contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 1 is a schematic illustration of an aircraft approaching a vortex for determining various boundary conditions, constraints, control laws, and differential equations, according to some embodiments.

FIG. 2 is a graphical representation of Lagrangian multipliers of the various boundary conditions, constraints, control laws, and differential equation of FIG. 1, according to some embodiments.

FIGS. 11A-B are MATLAB® code which may be used by the controller of FIG. 9, according to some embodiments.

FIG. 12 is MATLAB® code which may be used by the controller of FIG. 9, according to some embodiments.

FIG. 13 is MATLAB® code which may be used by the controller of FIG. 9, according to some embodiments.

FIG. 14 is MATLAB® code which may be used by the controller of FIG. 9, according to some embodiments.

FIG. 16 shows changes to the MATLAB® code of FIG. 12 to account for multiple vortices, according to some embodiments.

FIG. 17 shows changes to the MATLAB® code of FIG. 14 to account for multiple vortices, according to some embodiments.

DETAILED DESCRIPTION

Figure 3A:
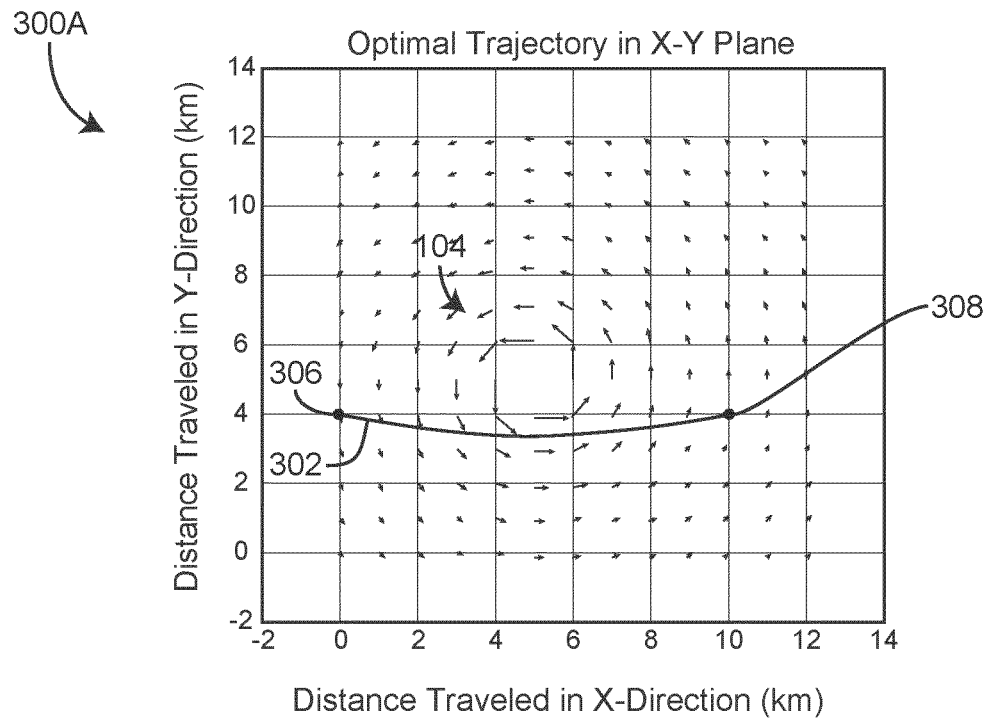
FIG. 3A is a graph of flight path information of a trajectory around a vortex, determined using any of the techniques described with reference to FIGS. 1-2, according to some embodiments.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

Overview

Referring generally to the FIGURES, methods and techniques for determining an optimal flight path between a starting point and an ending point of an aircraft approaching one or more vortices (e.g., storms) are shown, according to some embodiments. In some embodiments, these methods and techniques are implemented on a controller, described in greater detail with reference to FIG. 9. In some embodiments, the flight path is optimal since it minimizes an amount of time required for the aircraft to travel from the starting point to the ending point. In some embodiments, the methods and techniques also includes determining control variable values (e.g., turn angle) for the aircraft to perform the optimal flight path. In some embodiments, and as described in greater detail below with reference to FIGS. 1-2, the methods and techniques used by the controller are based on Zermelo's theorem, Hamiltonian mechanics, and the Transversality Condition. In some embodiments, the optimal flight path and the control variable values used to achieve the optimal flight path are provided to a pilot via a display (e.g., an FMS) or are used to automatically adjust an operation of the aircraft to follow the optimal flight path (e.g., an autopilot system). Advantageously, the controller which uses the methods and techniques described herein reduces the need for pilots to judgmentally determine steering angles, improves flight time of the aircraft, and improves efficiency of the aircraft by minimizing travel time of the aircraft. In some embodiments, the controller is implemented locally on the aircraft (e.g., as a component of the aircraft FMS). In some embodiments, the controller is remotely implemented and provides one or more avionics systems of the aircraft with the optimal flight path and control variable values to achieve the optimal flight path.

Figure 6:
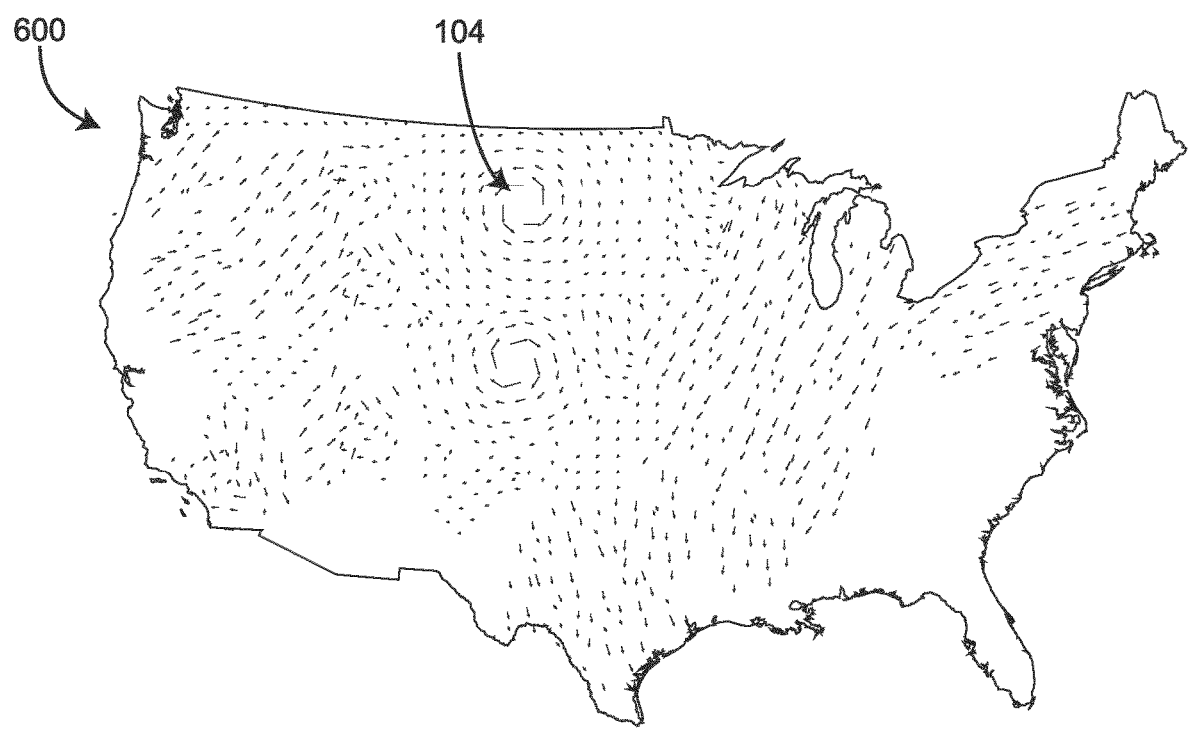
FIG. 6 is a map illustrating various weather patterns and winds, according to some embodiments.
Figure 7:
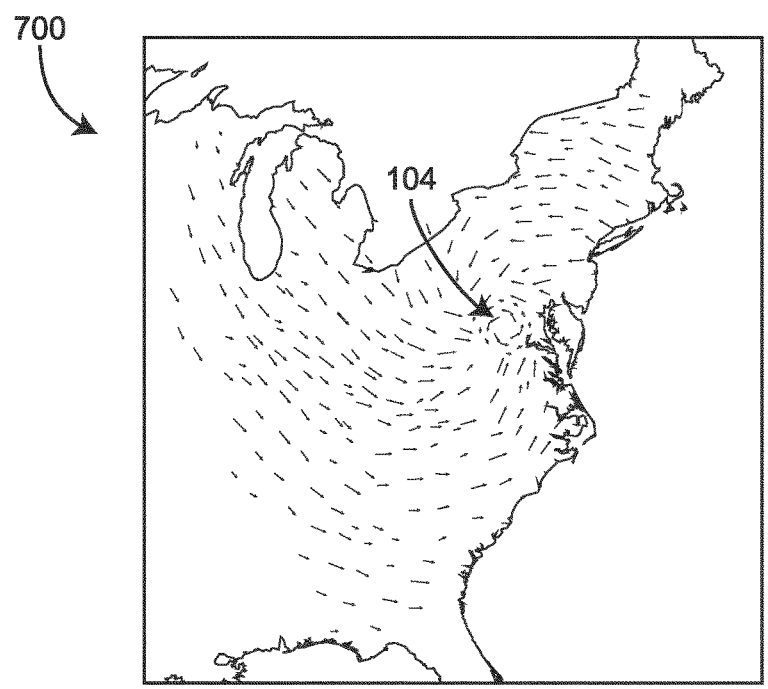
FIG. 7 is a map illustrating various weather patterns and winds, according to some embodiments.

Referring to FIGS. 6-7, maps 600 and 700 show various wind patterns across the United States of America, according to some embodiments. In some embodiments, storms or wind patterns produce vortices 104. As an aircraft encounters a vortex produced by a storm or a wind pattern, the pilot must determine a flight path to take which does not cause the aircraft to become significantly blown off course. In some embodiments, the methods, techniques, and functionality described herein apply Zermelo's theorem to determine an optimal flight which minimizes an amount of time to bypass vortices 104. In some embodiments, the optimal flight path may be used by an auto-pilot system or may be provided to a pilot for manual operation and advisement. Advantageously, determining a flight path which minimizes an amount of time to bypass (e.g., fly around) a vortex improves aircraft efficiency by reducing flying time, and reduces the likelihood that the aircraft will be blown off course by the vortex.

Minimization Function and State Equations

Referring now to FIG. 1, a diagram 100 is shown, according to some embodiments. Diagram 100 illustrates a velocity representation of a vortex (e.g., a wind vortex, a tornado, a storm, a hurricane, etc.), according to some embodiments. In some embodiments, diagram 100 includes aircraft 102, shown approaching vortex 104. In some embodiments, vortex 104 is generally circular shaped having an eye, shown as center 118, an outer circumference 106, a center 118, and a radius 110. In some embodiments, tangential velocity of vortex 104 is inversely related to radius 110. It should be noted that radius 110 is a reference radius value, which is used for illustrative purposes only, according to some embodiments. In some embodiments, outer circumference 106 is also for illustrative purposes only. In some embodiments, diagram 100 includes a coordinate system, shown as Cartesian coordinate system 130. In some embodiments, Cartesian coordinate system 130 includes an X-direction and a Y-direction perpendicular to the X-direction, according to some embodiments. In some embodiments, radius 110 is represented by variable r. In some embodiments, radius 110 is a distance which aircraft 102 is from center 118 of vortex 104.

Vortex 104 rotates about center 118 in direction 108 at angular velocity $\omega_{vortex}$, according to some embodiments. In some embodiments, vortex 104 rotates about center 118 in a direction opposite direction 108. In some embodiments, vortex 104 includes a tangential vortex speed 126 (e.g., windspeed) at radius 110. In some embodiments, tangential vortex speed 126 is represented by the variable $u_\theta$. In some embodiments, tangential vortex speed 126 is defined by equation (1) shown below:

$$u_\theta = \frac{\Gamma}{2\pi r} \quad (1)$$

where $u_\theta$ is tangential vortex speed (e.g., tangential vortex speed 126), $\Gamma$ is a strength of the storm (e.g., a strength of vortex 104), and r is an arbitrary radius of vortex 104 (e.g., radius 110). In some embodiments, equation (1) is the Anderson Vortex Equation. In some embodiments, equation (1) is converted to Cartesian coordinates before it can be used to determine an optimal path of aircraft 102.

In some embodiments, state equations are used to convey the X and Y Cartesian velocity components of vortex 104. The state equations are shown in equations (2) and (3) below:

$$\dot{x} = V\cos(\theta) + u(x,y) \quad (2)$$

$$\dot{y} = V\sin(\theta) + v(x,y) \quad (3)$$

where $\dot{x}$ is a co-state variable of the X-direction, $\dot{y}$ is a co-state variable of the Y-direction, y is the Y-direction, x is the X-direction, V is a constant airspeed of aircraft 102, u(x, y) is a component of regional windspeed (e.g., wind 132) in the X-direction (i.e., x-velocity 116), v(x, y) is a component of regional windspeed (e.g., wind 132) in the Y-direction (i.e., y-velocity 128), and $\theta$ is a steering direction of aircraft 102. In some embodiments, before equation (1) can be used with equations (2) and (3), it must be converted into Cartesian coordinates.

In some embodiments, radius 110 (i.e., r) is converted into Cartesian coordinates using equation (4) shown below:

$$r = \sqrt{(x-x_c)^2 + (y-y_c)^2} \quad (4)$$

where r is radius 110, $x_c$ is an X-coordinate position of center 118, and $y_c$ is a Y-coordinate position of center 118.

Equation (4) can be substituted for r in equation (1), yielding equation (5), shown below:

$$u_\theta = \frac{\Gamma}{2\pi\sqrt{(x-x_c)^2 + (y-y_c)^2}} \quad (5)$$

according to some embodiments.

From FIG. 1, equations (6) and (7) can be determined, shown below:

$$u = u_\theta \cos(90 - \varphi) = u_\theta \sin(\varphi) \quad (6)$$

$$\sin(\varphi) = \frac{y - y_c}{r} \quad (7)$$

where $\varphi$ is angle 122 defined between an X-direction extending radially outwards from center 118 and radius 110, and $(90-\varphi)$ is angle 114, according to some embodiments. Substituting equation (4) into equation (7) yields equation (8), shown below:

$$\sin(\varphi) = \frac{y - y_c}{\sqrt{(x-x_c)^2 + (y-y_c)^2}} \quad (8)$$

according to some embodiments.

Substituting equation (8) into equation (7) yields equation (9) shown below:

$$u = u_\theta \frac{y - y_c}{\sqrt{(x-x_c)^2 + (y-y_c)^2}} \quad (9)$$

according to some embodiments.

Substituting equation (1) into equation (9) and expanding yields equation (10), shown below:

$$u = -\frac{\Gamma}{2\pi\sqrt{(x-x_c)^2 + (y-y_c)^2}} \cdot \frac{y - y_c}{\sqrt{(x-x_c)^2 + (y-y_c)^2}} \quad (10)$$

according to some embodiments.

Reducing equation (10) yields equation (11), shown below:

$$u = u(x, y) = -\frac{\Gamma}{2\pi} \cdot \frac{y - y_c}{(x-x_c)^2 + (y-y_c)^2} \quad (11)$$

according to some embodiments.

The Y-component of tangential velocity 126 is similarly determined, shown in equation (12) below:

$$v = v(x, y) = \frac{\Gamma}{2\pi} \cdot \frac{x - x_c}{(x-x_c)^2 + (y-y_c)^2} \quad (12)$$

according to some embodiments.

Substituting equations (11) and (12) into equations (2) and (3), respectively, yields equations (13) and (14), shown below:

$$\dot{x} = V\cos(\theta) - \frac{\Gamma}{2\pi} \cdot \frac{y - y_c}{(x - x_c)^2 + (y - y_c)^2} \quad (13)$$

$$\dot{y} = V\sin(\theta) + \frac{\Gamma}{2\pi} \cdot \frac{x - x_c}{(x - x_c)^2 + (y - y_c)^2} \quad (14)$$

according to some embodiments.

Equations (13) and (14) can be used when there is only one vortex 104 having a center 118 positioned at $(x_c, y_c)$ and strength $\Gamma$, according to some embodiments.

In some embodiments, for two vortices 104, the contribution of each vortex 104 are added to equations (13) and (14), shown in equations (15) and (16) below:

$$\dot{x} = V\cos(\theta) - \frac{\Gamma_1}{2\pi} \cdot \frac{y - y_{c,1}}{(x - x_{c,1})^2 + (y - y_{c,1})^2} - \frac{\Gamma_2}{2\pi} \cdot \frac{y - y_{c,2}}{(x - x_{c,2})^2 + (y - y_{c,2})^2} \quad (15)$$

$$\dot{y} = V\sin(\theta) + \frac{\Gamma_1}{2\pi} \cdot \frac{x - x_{c,1}}{(x - x_{c,1})^2 + (y - y_{c,1})^2} + \frac{\Gamma_2}{2\pi} \cdot \frac{x - x_{c,2}}{(x - x_{c,2})^2 + (y - y_{c,2})^2} \quad (16)$$

according to some embodiments.

In some embodiments, for a number n of vortices 104, equations (15) and (16) can be genericized, yielding equations (17) and (18), shown below:

$$\dot{x} = V\cos(\theta) - \sum_{i=1}^{n} \frac{\Gamma_i}{2\pi} \cdot \frac{y - y_{c,i}}{(x - x_{c,i})^2 + (y - y_{c,i})^2} \quad (17)$$

$$\dot{y} = V\sin(\theta) + \sum_{i=1}^{n} \frac{\Gamma_i}{2\pi} \cdot \frac{x - x_{c,i}}{(x - x_{c,i})^2 + (y - y_{c,i})^2} \quad (18)$$

according to some embodiments.

In some embodiments, to determine the optimal path of aircraft 102, a minimization function is defined, shown as equation (19) below:

$$\min(J) = t_f \quad (19)$$

where $\min(J)$ is a minimization of cost J, and $t_f$ is an optimal and minimum amount of time for aircraft 102 to travel between a first location and a second location, according to some embodiments.

Fully Formed Two Point Boundary Problem

The description that follows herein uses Zermelo's theorem and Hamiltonian mechanics to define a fully formed two point boundary problem, according to some embodiments. Before solving any optimization problem, boundary conditions must be defined, according to some embodiments. In some embodiments, the optimization problem of equation (19) and equations (17) and (18) must have boundary conditions. For this optimization problem, since there are two state equations (equations (17) and (18)), there must be six boundary conditions. Five of the six boundary conditions are already known/are given since it is assumed that a starting point and ending point of aircraft 102 are known, according to some embodiments. In some embodiments, the five known/given conditions are shown in equations (20)-(24) below:

$$t_0 = 0 \quad (20)$$

$$x_0 = \text{Given} \quad (21)$$

$$y_0 = \text{Given} \quad (22)$$

$$x_f = \text{Given} \quad (23)$$

$$y_f = \text{Given} \quad (24)$$

where $t_0$ is an initial time, $x_0$ is an initial X-position of aircraft 102, $y_0$ is an initial Y-position of aircraft 102, $x_f$ is a final X-position of aircraft 102, and $y_f$ is a final Y-position of aircraft 102. In some embodiments, $t_0 = 0$ since it is assumed that the initial time is zero, and $x_0$, $y_0$, $x_f$, and $y_f$ are known since it is assumed that the initial and final position of aircraft 102 are known/input values.

In order to determine the sixth boundary condition, the transversality condition is used, shown as equation (25) below:

$$H_f dt_f - \lambda_{1f} dx_f - \lambda_{2f} dx_f + dg = 0 \quad (25)$$

where $H_f$ is the Hamiltonian at the final time, $dt_f$ is a rate of change of $t_f$, $\lambda_{1f}$ is a first Lagrange Multiplier, $dx_f$ is a rate of change of $x_f$, $\lambda_{2f}$ is a second Lagrange Multiplier, g is a terminal cost, and dg is a rate of change of the terminal cost g, according to some embodiments. Since $x_f$ and $y_f$ are set values and do not vary/change, $dx_f = 0$ and $dy_f = 0$, according to some embodiments. Additionally, $g = t_f$ according to some embodiments. This allows equation (25) to be reduced to equation (26), shown below:

$$H_f dt_f + dt_f = dt_f (H_f + 1) = 0 \quad (26)$$

according to some embodiments.

Since $t_f$ will vary, $dt_f \neq 0$, and therefore $(H_f + 1)$ must equal zero to satisfy equation (26), according to some embodiments. In some embodiments, this yields equation (27), shown below:

$$(H_f + 1) = 0 \quad (27)$$

according to some embodiments.

Solving equation (27) for $H_f$ yields the sixth and final boundary condition, shown as equation (28) below:

$$H_f = -1 \quad (27)$$

according to some embodiments.

The six boundary conditions of equations (20)-(24) and (27) are shown below:

$$t_0 = 0 \quad (20)$$

$$x_0 = \text{Given} \quad (21)$$

$$y_0 = \text{Given} \quad (22)$$

$$x_f = \text{Given} \quad (23)$$

$$y_f = \text{Given} \quad (24)$$

$$H_f = -1 \quad (27)$$

according to some embodiments.

Control Law

Referring now to FIGS. 1-2, the derivations of the control law are shown, according to some embodiments. In order to perform a numerical approach to solving the optimization problem, the Hamiltonian must be found, according to some embodiments. After the Hamiltonian is found, the derivative of the Hamiltonian with respect to the control (e.g., θ) is equated to zero in order to produce the control law, according to some embodiments. This is possible since the control (i.e., θ with respect to the X-axis) is unbounded, according to some embodiments. The Hamiltonian is shown in equation (28) below:

$$H = L + \lambda^T f \quad (28)$$

where $L=0$, $\lambda^T$ is Lagrangian multipliers transposed (i.e., $[\lambda_1 \; \lambda_2]$, and f is $$\begin{bmatrix} \dot{x} \\ \dot{y} \end{bmatrix},$$

according to some embodiments. Substituting these values and expanding equation (28) yields equation (29) shown below:

$$H = \lambda_1 \dot{x} + \lambda_2 \dot{y} \quad (29)$$

according to some embodiments. Substituting equations (13) and (14) into equation (29) and expanding yields equation (30), shown below:

$$H = \lambda_1 \left( V\cos(\theta) - \frac{\Gamma}{2\pi} \cdot \frac{y - y_c}{(x - x_c)^2 + (y - y_c)^2} \right) + \lambda_2 \frac{d}{dt}\left( y = V\sin(\theta) + \frac{\Gamma}{2\pi} \cdot \frac{x - x_c}{(x - x_c)^2 + (y - y_c)^2} \right) \quad (30)$$

according to some embodiments. Since the control is unbounded, $H_\theta = 0$, according to some embodiments. Setting equation (30) equal to 0 and reducing equation (30) yields equation (31), shown below:

$$H_\theta = -\lambda_1 V \sin(\theta) + \lambda_2 V \cos(\theta) = 0 \quad (31)$$

according to some embodiments. From equation (31) above, equation (32) can be determined, shown below:

$$\tan(\theta) = \frac{\lambda_2}{\lambda_1} \quad (32)$$

according to some embodiments. Equation (32) is visualized with right triangle 200 of FIG. 2, according to some embodiments. Right triangle 200 is shown having base 204, height 202, hypotenuse 208, and angle 206, according to some embodiments. In some embodiments, base 204 is $\lambda_1$, height 202 is $\lambda_2$, angle 206 is θ. From the Pythagorean theorem, hypotenuse 208 is determined to equal $\sqrt{\lambda_1^2 + \lambda_2^2}$, according to some embodiments.

From FIG. 2, equations (33) and (34) are determined, shown below:

$$\cos(\theta) = \pm \frac{\lambda_1}{\sqrt{\lambda_1^2 + \lambda_2^2}} \quad (33)$$

$$\sin(\theta) = \pm \frac{\lambda_2}{\sqrt{\lambda_1^2 + \lambda_2^2}} \quad (34)$$

according to some embodiments. Using the Legendre-Clebsch condition, the correct sign (i.e., + or −) for equations (33) and (34) is determined, shown in equations (35)-(38) below:

$$H_{\theta\theta} \geq 0 \quad (35)$$

$$H_{\theta\theta} = -\lambda_1 V \cos(\theta) - \lambda_2 V \sin(\theta) \geq 0 \quad (36)$$

$$-\lambda_1 V \cos(\theta) - \lambda_2 V \sin(\theta) \geq 0 \quad (37)$$

$$-\lambda_1 V \pm \frac{\lambda_1}{\sqrt{\lambda_1^2 + \lambda_2^2}} - \lambda_2 V \pm \frac{\lambda_2}{\sqrt{\lambda_1^2 + \lambda_2^2}} \geq 0 \quad (38)$$

according to some embodiments. Equation (35) is the Legendre-Clebsch condition (the derivative of equation (31) with respect to the input θ), equation (36) shows substitution of the derivative of equation (31) with respect to the input θ into equation (35), and equation (38) shows substitution of equations (33) and (34) into equation (37), according to some embodiments. From equation (38) above it can be shown that in order to keep the left side of equation (38) greater than or equal to zero, the negative sign must be chosen in equations (33) and (34), according to some embodiments.

Using the differential equations (2) and (3) or (13) and (14) or (15) and (16) or (17) and (18), in addition to the various boundary conditions (e.g., equations (20)-(25) and (27)) and the control law (e.g., equation (38)), a route of aircraft 102 which minimizes $t_f$ is determined, according to some embodiments. In some embodiments, a solver is used to determine the route of aircraft 102. In some embodiments, an Ordinary Differential Equation (ODE) solver is used. In some embodiments, the three-stage Lobatto IIIa formula is used. In some embodiments, before the differential equations are input to the solver, Additional Wind Considerations
Other Types of Wind In some embodiments, other types of wind are considered as opposed to simply winds/storms which act as a vortex. The other winds are measured, detected, sensed, provided, etc., values which are implemented in the existing state equations (equations (17) and (18)), as shown in equations (39) and (40) below:

$$\dot{x} = V\cos(\theta) - \sum_{i=1}^{n} \frac{\Gamma_i}{2\pi} \frac{y - y_{c,i}}{(x - x_{c,i})^2 + (y - y_{c,i})^2} + OtherWind(x) \quad (39)$$

$$\dot{y} = V\sin(\theta) + \sum_{i=1}^{n} \frac{\Gamma_i}{2\pi} \frac{x - x_{c,i}}{(x - x_{c,i})^2 + (y - y_{c,i})^2} + OtherWind(y) \quad (40)$$

according to some embodiments. In some embodiments, the x and y components of the other wind (i.e., OtherWind(x) and OtherWind(y), respectively), are added to equations (17) and (18).

Wind Sources

In some embodiments, wind sources are additionally considered. In some embodiments, wind sources act as points from which winds are emitted radially outwards. The winds emitted radially outwards have only radial velocity, shown in equation (41) below:

$$v_r = \frac{m}{2\pi r} \tag{41}$$

according to some embodiments. In equation (41) shown above, m is acceleration of air/wind emitted from the wind source, and r is a radial distance from the point source and a location, according to some embodiments. It should be noted that for wind sources, the tangential velocity is zero, according to some embodiments. In some embodiments, equation (41) can be converted into Cartesian coordinates and used in equations for $\dot{x}$ and $\dot{y}$ similarly to process used to convert and incorporate the tangential vortex wind. In some embodiments, wind sources are produced from a downdraft hitting the earth and flowing radially outwards from that location.

Wind Sinks

In some embodiments, wind sinks are additionally considered. In some embodiments, wind sinks are treated as a point sink which consume some amount of wind (e.g., a low pressure area). In some embodiments, wink sinks are uncommon. In some embodiments, wind sinks are treated similarly to wind sources which consume wind instead of emitting wind.

Uni-Directional Wind

In some embodiments, uni-directional winds are additionally considered. In some embodiments, uni-directional winds require additional definitions to specify a region throughout which the uni-directional winds occur. Equations (42) and (43) demonstrate uni-directional winds in the Cartesian coordinate system, shown below:

$$\dot{x}_{wind} = (W \cos(\theta_{wind}))_{\{x | x_{min} < x < x_{max}\}} \tag{42}$$

$$\dot{y}_{wind} = (W \sin(\theta_{wind}))_{\{y | y_{min} < y < y_{max}\}} \tag{43}$$

according to some embodiments, where W is speed of the uni-directional wind, $x_{min}$ and $x_{max}$ are X-axis boundaries throughout which the uni-directional wind is present, $y_{min}$ and $y_{max}$ are Y-axis boundaries throughout which the uni-directional wind is present, and $\theta_{wind}$ is an angle of the uni-directional wind relative to the Cartesian coordinate system. In some embodiments, equations (42) and (43) are added to any of the state variable equations for $\dot{x}$ and $\dot{y}$. In some embodiments, equations (42) and (43) are only added to the state variable equations for $\dot{x}$ and $\dot{y}$ if aircraft 102 is within the X-axis and Y-axis boundaries of the uni-directional wind. In some embodiments, equations (42) and (43) are added to the state variable equations for use in the solver.

No-Fly Zones and Wind Sources

Figure 8:
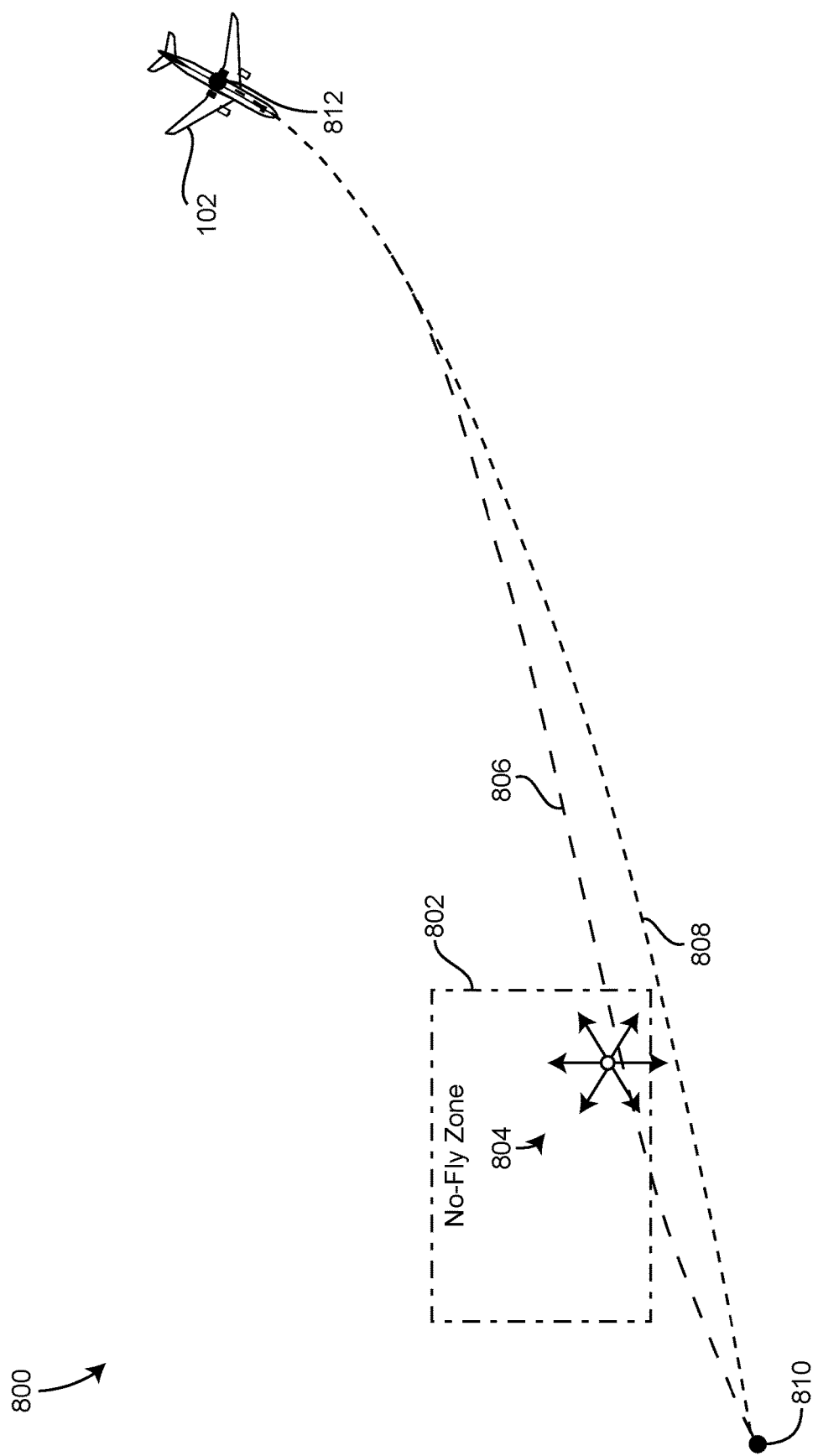
FIG. 8 is a schematic illustration of an aircraft on a flight path including a diagram showing an effect of adding a wind source to a no-fly zone using any of the techniques described with reference to FIGS. 1-2, according to some embodiments.

Referring now to FIG. 8, diagram 800 shows aircraft 102 approaching a no-fly zone 802, according to some embodiments. In some embodiments, the present flight path 806 as determined by the solver between starting point 812 and ending point 810 guides aircraft 102 through no-fly zone 802. In order to prevent the solver from determining a solution which requires aircraft 102 to fly through/over a no-fly zone (e.g., no-fly zone 802), a wind source, shown as wind source 804 is added to no-fly zone 802, according to some embodiments. In some embodiments, the solver identifies wind source 804 and determines an alternate flight path 808 which avoids wind source 804 and consequently avoids no-fly zone 802. Advantageously, adding wind sources near or within no-fly zones 802 ensures that the solver does not determine a solution which requires aircraft 102 to fly through a no-fly zone. No-fly zones may be any of zones which include buildings, Air Traffic Control (ATC) towers, restricted areas, highly turbulent areas, restricted airspace, etc. In some embodiments, the solver determines a solution which avoids the headwinds of wind source 804 to thereby ensure that the solver does not determine a solution which requires aircraft 102 to fly through the no-fly zone. In some embodiments, the position, number, and strength of wind source 804 are adjusted to ensure that the solution which the solver determines (e.g., alternate flight path 808) sufficiently avoids the no-fly zone (e.g., no-fly zone 802). In some embodiments, wind sources 804 are input manually by a user (e.g., a pilot). In some embodiments, the user can adjust a number, intensity, and position of one or more wind sources 804 to ensure that the solver determines an alternate flight path 808 which sufficiently avoids the no-fly zone (e.g., no-fly zone 802). In some embodiments, wind sources 804 are determined automatically. In some embodiments, the number, strength/intensity, and position of the wind sources are determined automatically to ensure that the solver does not determine an alternate flight path 808 which passes through no-fly zone 802. In some embodiments, an avoidance re-router application receives present flight path 806 and determines a number, intensity/strength, and position of one or more wind sources 804 to ensure that alternate flight path 808 does not pass through no-fly zone 802.

Resulting Graphs

Figure 3B:
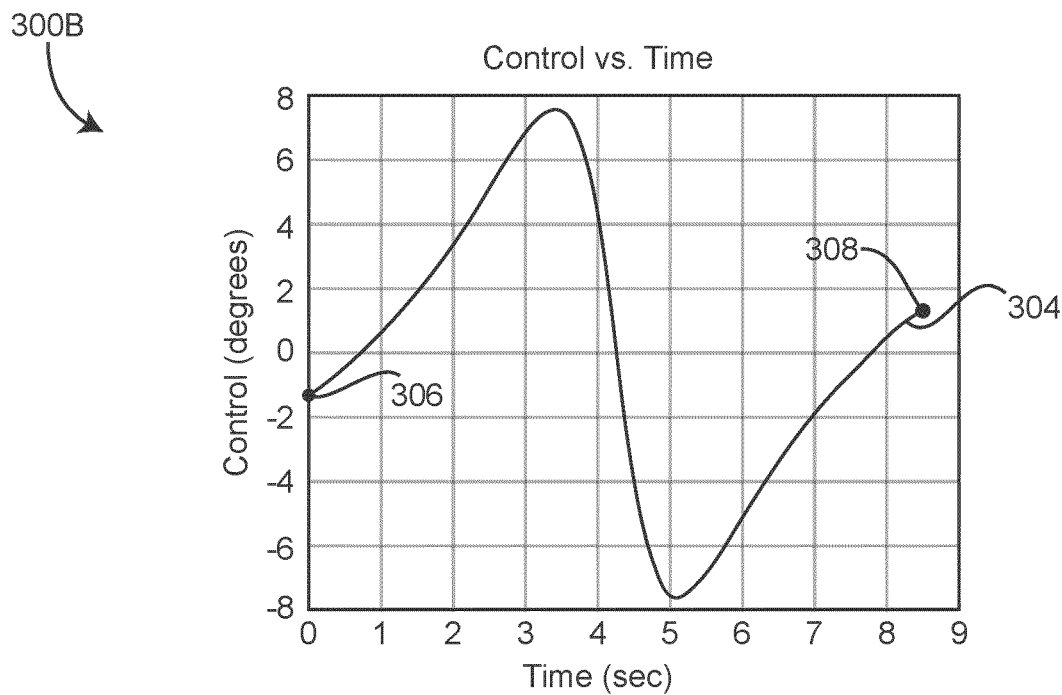
FIG. 3B is a graph of a control variable of the trajectory of the graph of FIG. 3A, according to some embodiments.
Figure 4A:
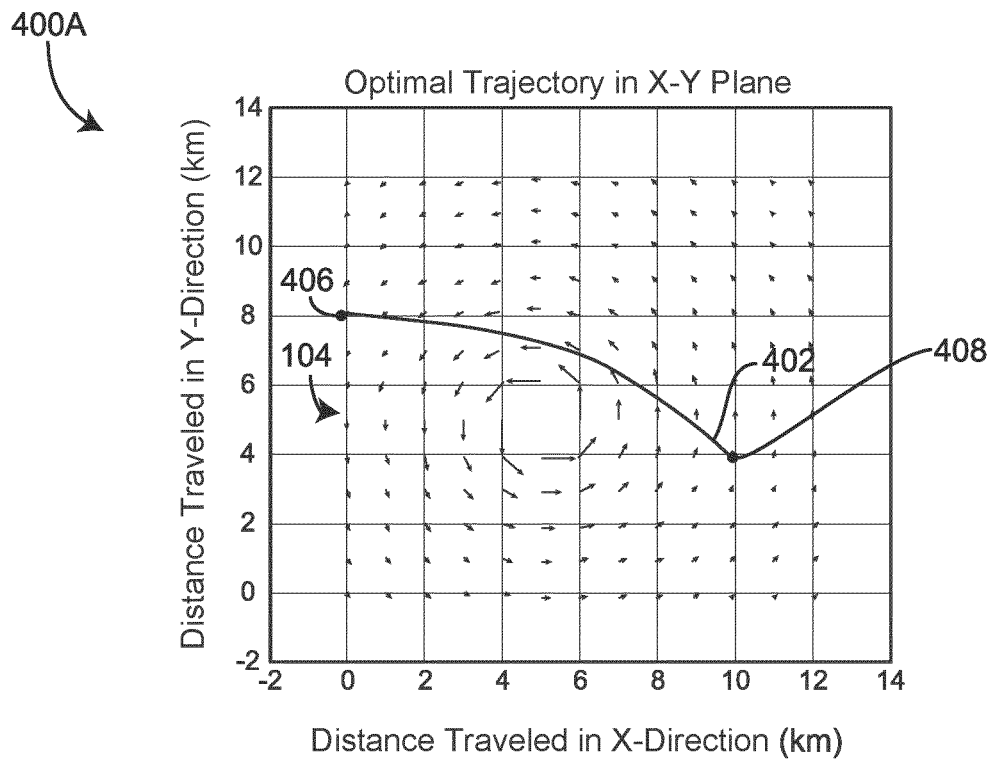
FIG. 4A is a graph of flight path information of a trajectory around a vortex, determined using any of the techniques described with reference to FIGS. 1-2, according to some embodiments.
Figure 4B:
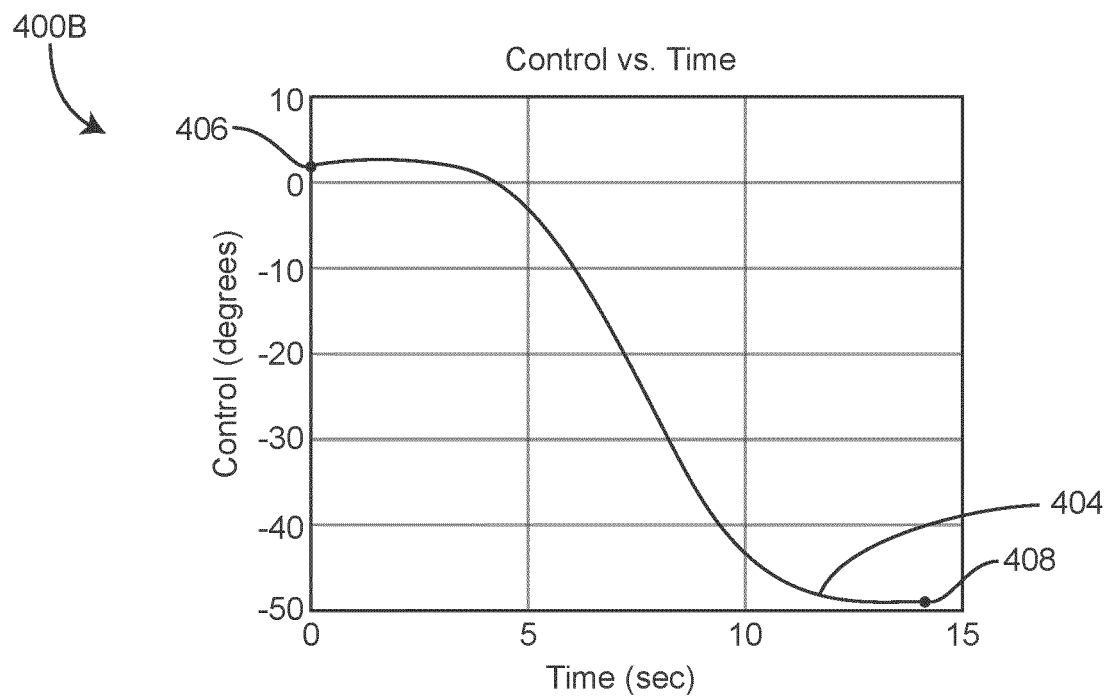
FIG. 4B is a graph of a control variable of the trajectory of the graph of FIG. 4A, according to some embodiments.
Figure 5A:
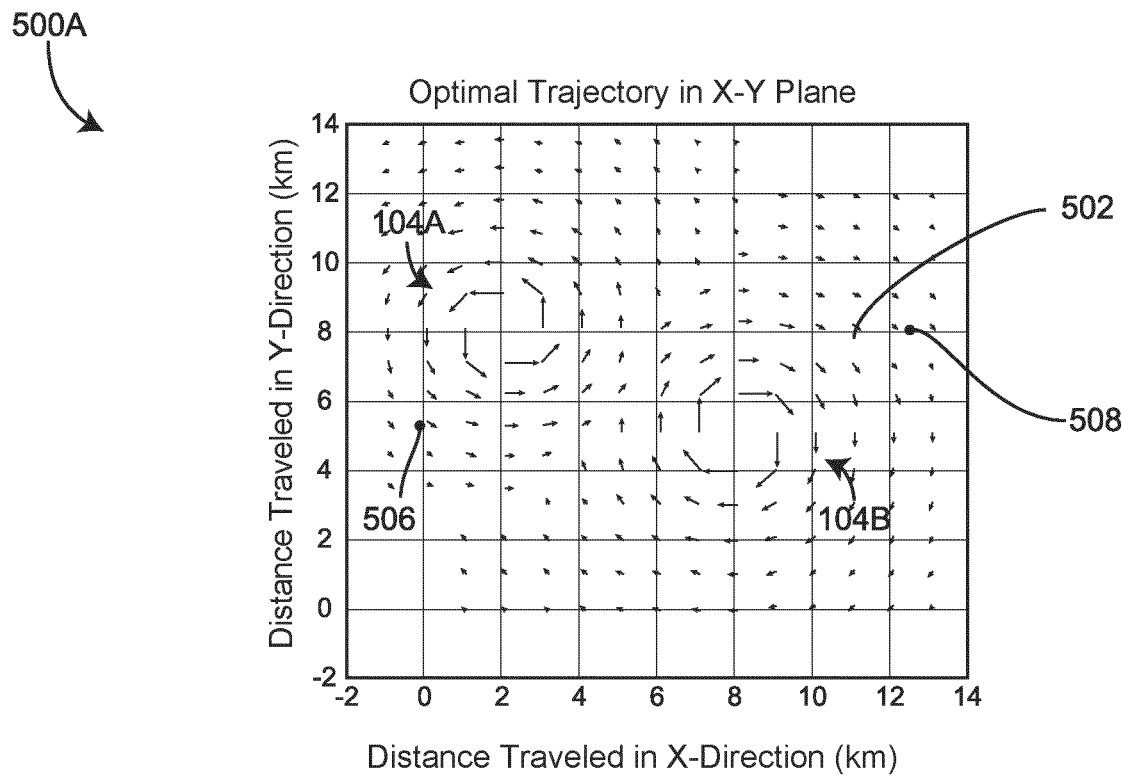
FIG. 5A is a graph of flight path information of a trajectory between two vortices, determined using any of the techniques described with reference to FIGS. 1-2, according to some embodiments.
Figure 5B:
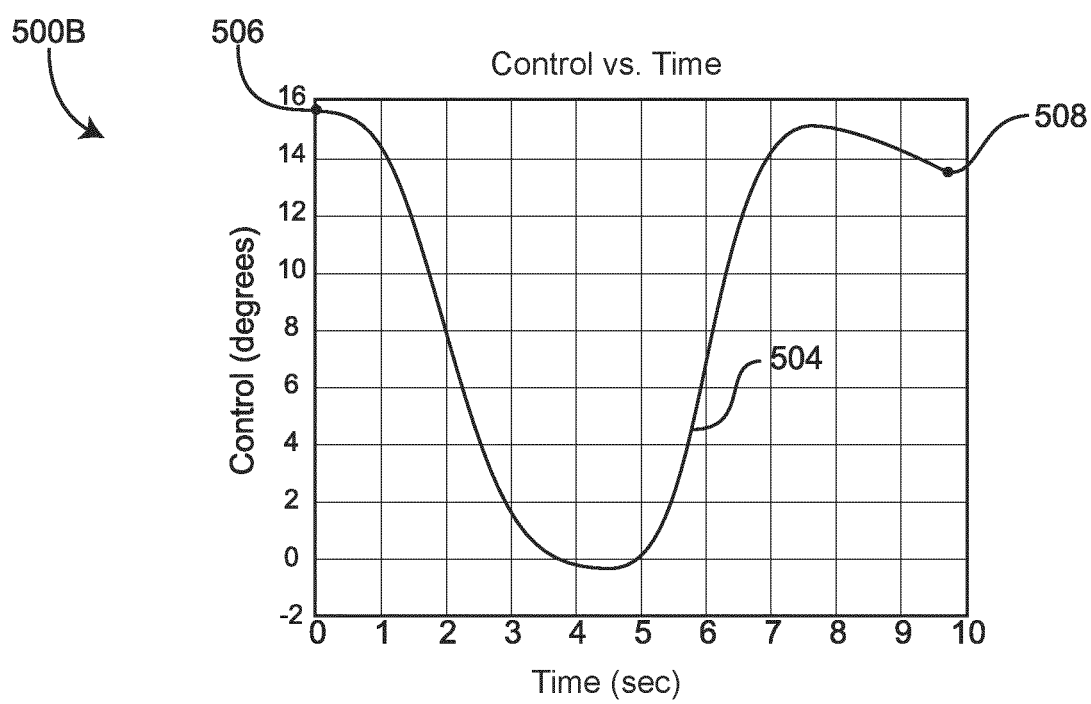
FIG. 5B is a graph of a control variable of the trajectory of the graph of FIG. 5A, according to some embodiments.

Referring now to FIGS. 3A-5B, various graphs are shown resulting from the solver, according to some embodiments. FIGS. 3A-3B show a solution determined by the solver which avoids a vortex 104, according to some embodiments. FIGS. 4A-4B show a solution determined by the solver which avoids a vortex 104, according to some embodiments. FIG. 5A-5B show a solution determined by the solver which avoids two vortices, vortex 104A and vortex 104B, according to some embodiments.

FIGS. 3A-3B show graph 300A and graph 300B, respectively, according to some embodiments. In some embodiments, graph 300A shows a flight path 302 (for aircraft 102) determined by the solver which avoids vortex 104. In some embodiments, graph 300B shows control with respect to time between starting point 306 and ending point 308 of flight path 302, represented by series 304. In some embodiments, starting point 306 has X-Y Cartesian coordinates of {0, 4} and ending point 308 has Cartesian coordinates of {10, 4}. In some embodiments, for FIGS. 3A and 3B, various initial conditions were input/provided shown below:

$x_0 = 0$ $y_0 = 4$ $x_f = 10$ $y_f = 4$ $H_f = -1$ $V = 1$ $x_c = 5$ km $y_c = 5$ km $\Gamma$ = Strength of Storm/Vortex = 5

In some embodiments, the initial Lagrangian multipliers for the results as shown in FIGS. 3A and 3B are assumed to be −1 in order to successfully produce flight path 302 and to determine series 304.

Referring to FIG. 3B, it can be shown that the initial hypothesis is apparent, according to some embodiments. In some embodiments, referring to FIGS. 3A and 3B, it can be seen that the solution determined by the solver utilizes the tailwind of vortex 104 as long as possible in order to minimize an amount of time to travel between starting point 306 and ending point 308. As shown in FIGS. 3A and 3B, aircraft 102 initially yawns to the left (positive θ) in order to prevent being carried downward by vortex 104, according to some embodiments. In some embodiments, this yawn/crab angle facilitates keeping aircraft 102 staying on course. When the wind from vortex 104 becomes a complete tailwind (e.g., around 4.3 seconds), aircraft 102 crabs to the right (negative θ) to prevent being carried away by the wind. From FIG. 3B, it can be seen that the amount of time $t_f$ for aircraft 102 to travel along flight path 302 from starting point 306 to ending point 308 is approximately 8.5 seconds.

Referring now to FIGS. 4A and 4B, graphs 400A and 400B show a case where a tailwind is not possible is shown in graphs 400A and 400B, according to some embodiments. In some embodiments, graph 400A shows a case where flight path 402 as determined by the solver does not attempt to capture a tailwind, since doing so would cause a drift away from course and would end up leading to a large time loss. Therefore, the best choice is to fly directly against the head wind, according to some embodiments. In some embodiments, starting point 406 and end point 408 as shown in FIGS. 4A and 4B are have values $x_0=0$, $y_0=8$, and $x_f=10$, $y_f=4$. Graph 400B and series 404 show the control of θ between starting point 406 and ending point 408, according to some embodiments. In some embodiments, it can be seen that the total amount of time for aircraft 102 to travel along flight path 402 from starting point 406 to ending point 408 is approximately $t_f=14$ sec.

Referring now to FIGS. 5A and 5B, graphs 500A and 500B show flight path 502 determined by the solver for two vortices, vortex 104A and vortex 104B, according to some embodiments. In some embodiments, vortex 104A is positioned at approximately the Cartesian X-Y location {2, 8}, and vortex 104B is positioned at approximately the Cartesian X-Y location {8,5}. In some embodiments, starting point 506 has Cartesian X-Y coordinates {0,5} and ending point 508 has Cartesian X-Y coordinates {12, 8} (i.e., $x_0=0$, $y_0=5$, $x_f=12$, and $y_f=8$). Graph 500B of FIG. 5B shows series 504 which represents variation of the control θ to achieve flight path 502, according to some embodiments. In some embodiments, flight path 502 allows aircraft 102 to capture as much tailwind as possible in order to arrive at ending point 508 as fast as possible (e.g., minimize $t_f$). In some embodiments, slight perturbations from a straight course between starting point 506 and ending point 508 can be seen as flight path 502 approaches vortices 104A and 104B. In some embodiments, the slight perturbations from the straight course facilitate a minimization of crosswind contact. From FIG. 5B, it can be seen that aircraft 102 yaws right from the course (decreasing steering angle θ) as cross winds from vortices 104A and 104B push aircraft 102 to the left, according to some embodiments. In some embodiments, once the crosswind ends (at approximately 7 seconds), aircraft 102 reduces this crab/yaw. As shown in graph 500B, it can be seen that the total amount of time for aircraft 102 to travel along flight path 508 as determined by the solver is approximately 9.8 seconds, according to some embodiments.

Controller

In some embodiments, any of the methods, functionality, and techniques described in greater detail above are implemented by a controller, shown as flight path controller 900, to determine an optimal flight path between a starting point and an ending point which minimizes an amount of time $t_f$ to travel between the starting point and the ending point while avoiding one or more vortices (e.g., due to a storm, a tornado, a hurricane, etc.). In some embodiments, flight path controller 900 is a Flight Management System (FMS) or aircraft 102 on which flight path controller 900 may be used. In some embodiments, flight path controller 900 is a device/system other than the FMS of aircraft 102. In some embodiments, any of the functionality and techniques used by flight path controller 900 are performed by the FMS of aircraft 102. In some embodiments, flight path controller 900 provides the FMS of aircraft 102 with various output information (e.g., the flight path, control variable decisions, etc.) so that the FMS can use the output information to either display guidance to a user (e.g., the pilot of aircraft 102) or to control an operation of aircraft 102 to follow the determined flight path.

In some embodiments, flight path controller 900 is configured to use, receive, or calculate any of the information and variables as described in greater detail above with reference to FIGS. 1-8. In some embodiments, flight path controller 900 is integrated as a component of (e.g., a processing circuit of, a software application of) another avionics system. In some embodiments, flight path controller 900 is communicably connected to or is a component of a data concentrator of a Pro Line Fusion® system, as produced by Rockwell Collins, Inc.

Flight path controller 900 is shown to include a processing circuit 902 having a processor 904 and memory 906, according to some embodiments. Processor 904 is a general purpose or specific purpose processor, an application specific integrated circuit (ASIC), one or more field programmable gate arrays (FPGAs), a group of processing components, or other suitable processing components, according to some embodiments. In some embodiments, processor 904 is configured to execute computer code or instructions stored in memory 906 or received from other computer readable media (e.g., CDROM, network storage, a remote server, etc.).

Memory 906 includes one or more devices (e.g., memory units, memory devices, storage devices, etc.) for storing data and/or computer code for completing and/or facilitating the various processes described in the present disclosure, according to some embodiments. Memory 604 includes any of random access memory (RAM), read-only memory (ROM), hard drive storage, temporary storage, non-volatile memory, flash memory, optical memory, or any other suitable memory for storing software objects and/or computer instructions, according to some embodiments. In some embodiments, memory 906 includes any of database components, object code components, script components, or any other type of information structure for supporting the various activities and information structures described in the present disclosure. Memory 906 is communicably connected to processor 904 via processing circuit 902 and includes computer code for executing (e.g., by processor 904) one or more processes described herein, according to some embodiments. When processor 904 executes instructions stored in memory 906, processor 904 generally configures flight path controller 900 (and more particularly processing circuit 902) to complete such activities, according to some embodiments.

Flight path controller 900 is shown to include communications interface 926, according to some embodiments. Communications interface 926 is configured to facilitate communications between flight path controller 900 and external applications (e.g., user interfaces, input interfaces, databases, avionics systems, devices, sensors, instruments, weather services, Flight Management Systems (FMS), etc.), according to some embodiments.

Communications interface 926 is or includes wired or wireless communications interfaces (e.g., jacks, antennas, transmitters, receivers, transceivers, wire terminals, etc.) for conducting data communications with information inputs, various databases and networks, avionics systems, sensors, devices, FMS, user interfaces, input interfaces, etc., according to some embodiments. In some embodiments, communications via communications interface 926 is direct (e.g., local wired or wireless communications) or via a communications network (e.g., a WAN, the Internet, a cellular network, etc.). For example, in some embodiments, communications interface 926 is or includes an Ethernet card and port for sending and receiving data via an Ethernet-based communications link or network. In some embodiments, communications interface 926 includes a WiFi transceiver for communicating via a wireless communications network. In some embodiments, communications interface 926 is or includes cellular or mobile phone communications transceivers. In some embodiments, communications interface 926 is a Universal Serial Bus interface.

Flight path controller 900 is shown receiving various input information via communications interface 926, according to some embodiments. In some embodiments, the various input information includes any of starting points, ending points, storm/wind data, no-fly zones, map information, etc., or any other information required for flight path controller 900 to determine a flight path which optimally avoids storms so as to reduce an amount of time between the starting point and the ending point. In some embodiments, flight path controller 900 outputs a flight path to any of a user interface 930 and FMS 932 of aircraft 102, according to some embodiments.

In some embodiments, flight path controller 900 is positioned on aircraft 102. In some embodiments, flight path controller 900 is configured to determine the flight path at an end of a time step (e.g., every 10 seconds, every 4 minutes, etc.). In some embodiments, flight path controller 900 is configured to determine the flight path in response to a change of one of the input information parameters (e.g., a change in storm/wind data, a change in end point, a change in map information, etc.). In some embodiments, flight path controller 900 is configured to receive any of the input information, determine the flight path based on the input information, and provide the flight path to any of user interface 930, FMS 932, or any other avionics system of aircraft 102. In some embodiments, flight path controller 900 provides flight path to FMS 932, and FMS 932 displays a map of an area surrounding aircraft 102 with the flight path super-imposed on the map. In some embodiments, FMS 932 selectively displays the flight path over the map in response to a request from a user (e.g., the pilot). In some embodiments, FMS 932 displays one or more waypoints along the flight path. In some embodiments, FMS 932 displays the flight path as a colored line (e.g., a red line, a yellow line, a pink line, etc.), to facilitate easy viewing by the user. In some embodiments, flight path controller 900 outputs the flight path to FMS 932 as a flight plan. In some embodiments, flight path controller 900 outputs a command to transition FMS 932 into an auto-pilot mode so that an auto-pilot system automatically adjusts an operation of aircraft 102 such that aircraft 102 follows the flight path.

Figure 9:
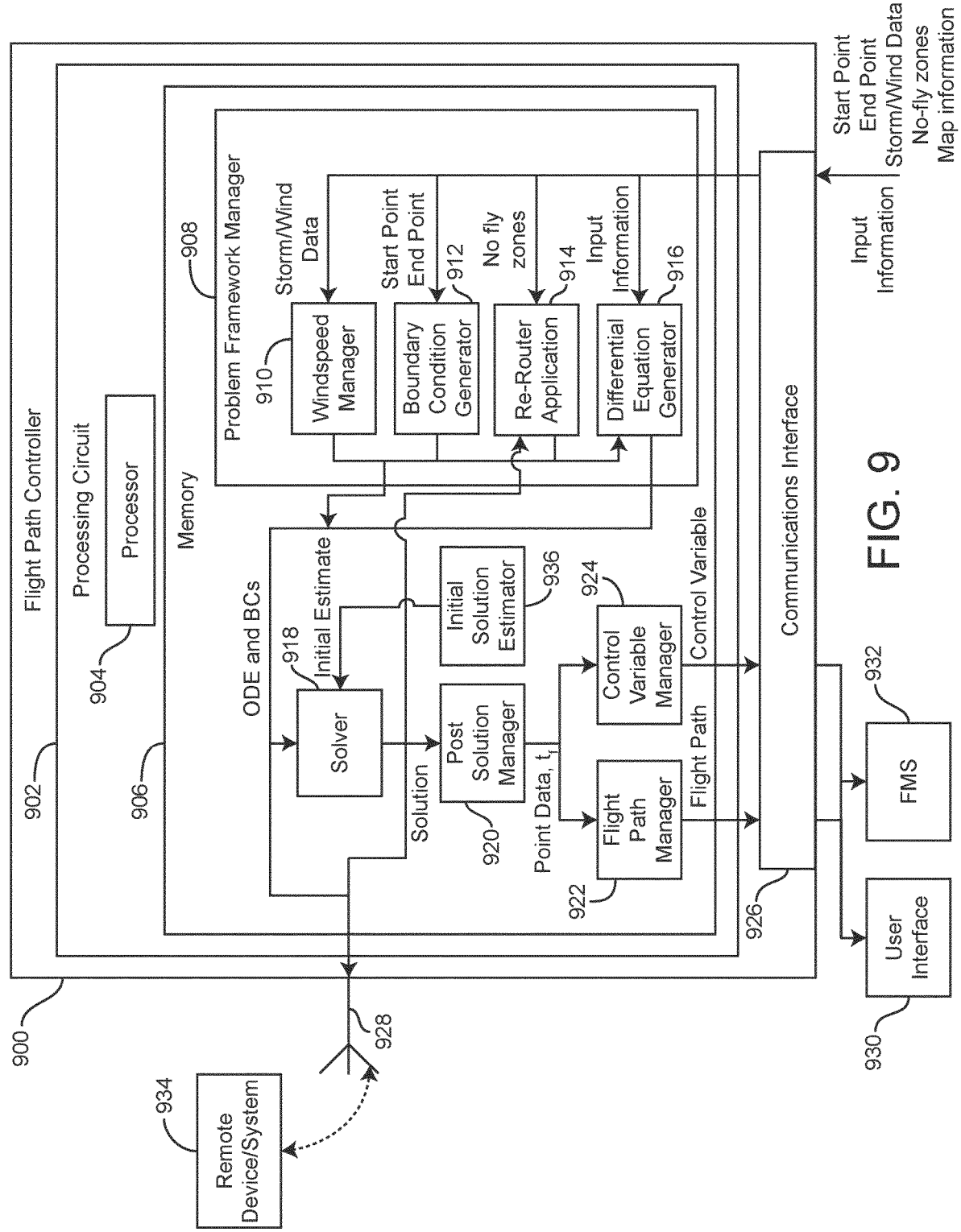
FIG. 9 is a general block diagram of a controller configured to use any of the techniques described with reference to FIGS. 1-2, according to some embodiments.

Referring still to FIG. 9, memory 906 includes problem framework manager 908, according to some embodiments. In some embodiments, problem framework manager 908 is configured to define an optimization problem for solver 918. In some embodiments, problem framework manager 908 uses any of equations (1)-(43) to define one or more differential equations, boundary conditions, and control laws such that the flight path and/or control variable outputs can be determined. In some embodiments, problem framework manager receives any of the start point, the end point, the storm/wind data, no-fly zones, and map information from one or more devices, avionics systems, weather services, radar, user interfaces, input interfaces, etc. In some embodiments, problem framework manager 908 outputs one or more ordinary differential equations (ODEs), one or more boundary conditions (BCs), and one or more constraints to solver 918. In some embodiments, solver 918 receives the one or more ODEs, the one or more BCs, and the one or more constraints, and solves the ODEs subject to the BCs. In some embodiments, solver 918 uses the three-stage Lobatto IIIa formula to solve the ODEs subject to the BCs. In some embodiments, solver 918 outputs a plurality of data points (e.g., a vector) indicating an optimal flight path between the starting point and the ending point. In some embodiments, solver 918 outputs a plurality of data points (e.g., a vector) which includes a control variable value (e.g., a value of θ) for each optimal flight path data point. In some embodiments, solver 918 provides post solution manager 920 with the optimal flight path data points and/or the control variable data points.

Referring still to FIG. 9, problem framework manager 908 is shown to include windspeed manager 910, according to some embodiments. In some embodiments, windspeed manager 910 receives storm/wind data via communications interface 926. In some embodiments, windspeed manager 910 receives storm/wind data from the FMS of aircraft 102. In some embodiments, windspeed manager 910 uses the received storm/wind data to determine Cartesian coordinates of the velocities of the storm/wind data. In some embodiments, windspeed manager 910 receives any of a strength of a vortical storm/wind (i.e., Γ), a position of a center of the one or more vortical storms/winds (e.g., Cartesian coordinates of center 118 of vortex 104), a distance which aircraft 102 is from the center of each of the one or more vortical storms/winds (e.g., r), and any information regarding other winds via communications interface 926. In some embodiments, windspeed manager 910 receives any of these storm/wind data from the FMS of aircraft 102. Windspeed manager 910 uses equations (39) and (40) to determine $\dot{x}$ and $\dot{y}$ for any arbitrary location {x, y}, according to some embodiments. Equations (39) and (40) are shown below:

$$\dot{x} = V\cos(\theta) - \sum_{i=1}^{n} \frac{\Gamma_i}{2\pi} \frac{y - y_{c,i}}{(x - x_{c,i})^2 + (y - y_{c,i})^2} + OtherWind(x) \quad (39)$$

$$\dot{y} = V\sin(\theta) + \sum_{i=1}^{n} \frac{\Gamma_i}{2\pi} \frac{x - x_{c,i}}{(x - x_{c,i})^2 + (y - y_{c,i})^2} + OtherWind(y) \quad (40)$$

according to some embodiments. In some embodiments, windspeed manager 910 receives a current speed V or aircraft 102. The variables of equations (39) and (40) which windspeed manager 910 may receive via communications interface 926 include $y_{c,i}$, $x_{c,i}$, $\Gamma_i$, and n, according to some embodiments. In some embodiments, windspeed manager 910 receives other wind information, for non-vortical wind. The non-vortical wind information which windspeed manager 910 is configured to receive via communications interface 926 includes any variables of the equations for source, sink, or unidirectional wind, shown below:

$$v_r = \frac{m}{2\pi r} \quad (41)$$

$$x_{wind} = (W\cos(\theta_{wind}))_{\{x|x_{min}<x<x_{max}\}} \quad (42)$$

$$y_{wind} = (W\sin(\theta_{wind}))_{\{y|y_{min}<y<y_{max}\}} \quad (43)$$

according to some embodiments. For example, windspeed manager 910 receives any of m, r, W, $\theta_{wind}$, $x_{min}$, $x_{max}$, $y_{min}$, and $y_{max}$. In some embodiments, windspeed manager 910 is configured to convert any of equations (41)-(43) which have non-Cartesian coordinates into Cartesian coordinates. In some embodiments, windspeed manager 910 incorporates (e.g., adds) any of equations (41)-(43) into the OtherWind(x) and OtherWind(y) terms of equations (39) and (40).

Windspeed manager 910 is configured to output equations (39) and (40) to solver 918 and/or differential equation generator 916, according to some embodiments. In some embodiments, solver 918 and differential equation generator 916 use the equations (39) and (40) to determine the optimal flight path and/or values of control variable $\theta$ which causes aircraft 102 to follow the optimal flight path.

In some embodiments, windspeed manager 910 uses modified forms of equations (11) and (12) shown as equations (11.1) and (12.1) below:

$$u = u(x, y) = -\frac{\Gamma_i}{2\pi} \frac{y - y_c}{(x - x_{c,i})^2 + (y - y_{c,i})^2} + OtherWind(x) \quad (11.1)$$

$$v = v(x, y) = \frac{\Gamma_i}{2\pi} \frac{x - x_c}{(x - x_{c,i})^2 + (y - y_{c,i})^2} + OtherWind(y) \quad (12.1)$$

Referring still to FIG. 9, problem framework manager 908 is shown to include boundary condition generator 912, according to some embodiments. In some embodiments, boundary condition generator 912 is configured to receive the starting and ending points via communications interface 926 (e.g., from a user input) and determine one or more boundary conditions for differential equation generator 916 and/or solver 918. For example, boundary condition generator 912 may receive the starting point and ending point in any form (e.g., latitude and longitude, polar coordinates, etc.) and determine one or more boundary conditions for solver 918 and/or differential equation generator 916. In some embodiments, boundary condition generator 912 applies any of $x_0$, $y_0$, $x_f$, $y_f$, $H_f$, and $t_f$ as boundary conditions to solver 918. In this way, boundary condition generator 912 is configured to facilitate a fully-formed and solvable problem for solver 918. In some embodiments, boundary condition generator 912 uses any of equations as shown above in greater detail with reference to the "Control Law" section to ensure that the optimization problem solved by solver 918 is fully formed and fully constrained.

Referring still to FIG. 9, problem framework manager 908 is shown to include re-router application 914, according to some embodiments. In some embodiments, re-router application 914 receives the flight path as determined by solver 918 and receives defined no-fly zones/areas via communications interface 926. In some embodiments, re-router application 914 is configured to determine if the flight path as determined by solver 918 passes through any of the no-fly zones. In some embodiments, if re-router application 914 determines that the flight path passes through any of the no-fly zones, re-router application 914 is configured to define one or more wind sources, position the one or more wind sources at the no-fly zone, and determine a strength of the one or more wind sources at the no-fly zone such that solver 918 does not determine a solution (e.g., the flight path) which passes through the no-fly zones. In some embodiments, re-router application 914 starts by placing one or more wind sources at the no-fly zone with relatively low strength. In some embodiments, re-router application 914 incrementally increases the strength of the one or more wind sources and determines for each incremental increase of the strength whether or not the flight path passes through any of the no-fly zones. In some embodiments, re-router application 914 continues incrementally increasing the strength of the one or more wind sources until solver 918 converges on a solution (e.g., flight path) which does not pass through the one or more no-fly zones.

Referring still to FIG. 9, problem framework manager 908 is shown to include differential equation generator 916, according to some embodiments. In some embodiments, differential equation generator 916 is configured to determine one or more differential equations and provide the differential equations to solver 918. In some embodiments, differential equation generator 916 receives any of the outputs of windspeed manager 910, boundary condition generator 912, and re-router application 914. In some embodiments, differential equation generator 916 uses any of the equations for co-state variables $\dot{x}$ and $\dot{y}$. For example, differential equation generator 916 may use equations (44) and (45), shown below:

$$\dot{x} = V\cos(\theta) + u(x, y) \quad (2)$$

$$\dot{y} = V\sin(\theta) + v(x, y) \quad (3)$$

where:

$$\cos(\theta) = \pm \frac{\lambda_1}{\sqrt{\lambda_1^2 + \lambda_2^2}} \quad (33)$$

$$\sin(\theta) = \pm \frac{\lambda_2}{\sqrt{\lambda_1^2 + \lambda_2^2}} \quad (34)$$

and:

$$u = u(x, y) = -\frac{\Gamma}{2\pi} \cdot \frac{y - y_c}{(x - x_c)^2 + (y - y_c)^2} + OtherWind(x) \quad (11.1)$$

$$v = v(x, y) = \frac{\Gamma}{2\pi} \cdot \frac{x - x_c}{(x - x_c)^2 + (y - y_c)^2} + OtherWind(y) \quad (12.1)$$

according to some embodiments. In this way, differential equation generator 916 defines co-state variables $\dot{x}$ and $\dot{y}$ in terms of $\lambda_1$, $\lambda_2$, according to some embodiments. In some embodiments, $u(x, y)$ and $v(x, y)$ are provided to differential equation generator 916 from windspeed manager 910.

In some embodiments, differential equation generator 916 provides solver 918 with equations (45) and (45) shown below:

$$\dot{\lambda}_1 = -\lambda_1 u(x,y,1) - \lambda_2 v(x,y,1) \quad (44)$$

$$\dot{\lambda}_1 = -\lambda_1 u(x,y,-1) - \lambda_2 v(x,y,-1) \quad (45)$$

where $\dot{\lambda}_1$ is a rate of change of $\lambda_1$, $\dot{\lambda}_2$ is a rate of change of $\lambda_2$, $u(x, y, 1)$ is $$\frac{\Gamma}{2\pi} \cdot \frac{2(x-x_c)(y-y_c)}{((x-x_c)^2+(y-y_c)^2)^2},$$

$$v(x, y, 1) \text{ is } \frac{\Gamma}{2\pi} \cdot \frac{-(x-x_c)^2+(y-y_c)^2}{((x-x_c)^2+(y-y_c)^2)^2},$$

$$u(x, y, -1) \text{ is } \frac{-\Gamma}{2\pi} \cdot \frac{(x-x_c)^2-(y-y_c)^2}{((x-x_c)^2+(y-y_c)^2)^2},$$

and $v(x, y, -1)$ is $\frac{-\Gamma}{2\pi}$ $$\frac{2(x-x_c)(y-y_c)}{((x-x_c)^2+(y-y_c)^2)^2}.$$

In some embodiments, the third input of u and y (1 and 1, respectively in equation (44)) is an indication if a derivative of whether or not a derivative of u and v is sought. In some embodiments, if a derivative does not need to be determined (e.g., the third input is zero), $u(x, y, 0) = -\frac{\Gamma}{2\pi} \cdot \frac{y-y_c}{(x-x_c)^2+(y-y_c)^2}$ and $$v(x, y, 0) = \frac{\Gamma}{2\pi} \cdot \frac{x-x_c}{(x-x_c)^2+(y-y_c)^2}.$$

In some embodiments, u and v are determined by windspeed manager 90 and provided to differential equation generator 916.

In some embodiments, differential equation generator 916 or solver 918 are configured to non-dimensionalize $\dot{x}$ and $\dot{y}$ or any other equations provided to solver 918 (e.g., equations (44) and (45)). For example, co-state variables $\dot{x}$ and $\dot{y}$ are derivatives with respect to time $$\left(\text{e.g., } \frac{dx}{dt} \text{ and } \frac{dy}{dt}\right)$$

according to some embodiments. In some embodiments, differential equation generator 916 or solver 918 are configured to convert the co-state variables into derivatives with respect to a non-dimensional time value τ. In some embodiments, $$\tau = \frac{t}{t_f}$$

which yields $$\frac{d}{d\tau} = t_f \frac{d}{dt}.$$

Differential equation generator 916 or solver 918 non-dimensionalize the co-state variables using equations (46) and (47) below:

$$\frac{dx}{d\tau} = t_f\left(\frac{dx}{dt}\right) = t_f \dot{x} = t_f\left(V\frac{-\lambda_1}{\sqrt{\lambda_1^2+\lambda_2^2}} + u(x,y)\right) \quad (46)$$

$$\frac{dy}{d\tau} = t_f\left(\frac{dy}{dt}\right) = t_f \dot{y} = t_f\left(V\frac{-\lambda_2}{\sqrt{\lambda_1^2+\lambda_2^2}} + v(x,y)\right) \quad (47)$$

according to some embodiments. In some embodiments, differential equations (46) and (47) are provided to solver 918 (or determined by solver 918). In some embodiments, any constraints, or control laws provided to solver 918 (e.g., by boundary condition generator 912) are also non-dimensionalized using a similar process (e.g., multiplying by $$\frac{d}{dt}$$

by $t_f$) as described herein above.

Solver 918 is configured to determine a solution to equations (46) and (47) subject to any of the boundary conditions, constraints, or control laws provided by problem framework manager 908, according to some embodiments. In some embodiments, solver 918 is a three-stage Lobatto IIIa solver. In some embodiments, solver 918 is a differential equation boundary value problem (BVP) solver. In some embodiments, solver 918 may determine more than one solution. In some embodiments, if solver 918 determines more than one solution, solver 918 or post solution manager 920 determines which of the solutions results in a lowest $t_f$. In some embodiments, the solution includes any of a solution for variables x, y, $\lambda_1$, and $\lambda_2$.

Referring still to FIG. 9, memory 906 is shown to include post solution manager 920, according to some embodiments. In some embodiments, post solution manager 920 is configured to receive the solution from solver 918, extract $t_f$ from the solution, and evaluate the solution at multiple steps between the starting point and the ending point. In some embodiments, post solution manager 920 outputs point data of the solution. In some embodiments, post solution manager 920 outputs point data of any of an X-positions of the optimal flight path (x), Y-positions of the optimal flight path (y), $\lambda_2$, and corresponding times $t_{dimensional}$. In some embodiments, the point data of the X-positions are output as vector $\vec{x}$, the point data of the Y-positions as vector $\vec{y}$, the point data of $\lambda_1$ are output as a vector $\vec{\lambda}_1$, the point data of $\lambda_2$ are output as vector $\vec{\lambda}_2$, and the point data of $t_{dimensional}$ are output as vector $\vec{t}$.

In some embodiments, post solution manager 920 is configured to convert back to dimensional time to determine $t_{dimensional}$. Post solution manager 920 uses equation (48) shown below to convert back to dimensional time:

$$t_{dimensional} = t_0 + \tau(t_f - t_0) \quad (48)$$

according to some embodiments. In some embodiments, if $t_0=0$, equation (48) reduces to: $t_{dimensional}=\tau t_f$. In some embodiments, $t_{dimensional}$ is $t_f$ with dimensions.

In some embodiments, post solution manager 920 determines the control variable θ for each set of $\lambda_1$ and $\lambda_2$ of $\vec{\lambda}_1$ and $\vec{\lambda}_2$. Post solution manager 920 uses equation (49) for each set of $\lambda_1$ and $\lambda_2$ to determine the control variable θ:

$$\vec{\theta}(k) = \tan^{-1}\frac{\vec{\lambda}_2(k)}{\vec{\lambda}_1(k)} \quad (49)$$

according to some embodiments. In some embodiments, equation (49) above shows taking the inverse tangent of kth element of $\vec{\lambda}_2$ and a corresponding kth element of $\vec{\lambda}_1$. In some embodiments, equation (49) is performed by each element of $\vec{\lambda}_1$ and $\vec{\lambda}_2$. Therefore, if $\vec{\lambda}_2$ and $\vec{\lambda}_1$ have 250 elements, $\vec{\theta}$ would similarly have 250 elements (i.e., a value of control variable θ for each set of $\lambda_1$ and $\lambda_2$ values).

In some embodiments, post solution manager 920 provides any of $\vec{x}$, $\vec{y}$, and $\vec{\theta}$ to flight path manager 922 and control variable manager 924. In some embodiments, $\vec{x}$, $\vec{y}$, and $\vec{\theta}$ are vectors having a same number of elements. In some embodiments, $\vec{\theta}$ is a value of the control variable θ (i.e., steering angle) for corresponding $\vec{x}$ and $\vec{y}$ locations. In some embodiments, flight path manager 922 and control variable manager 924 are configured to generate graphs of $\vec{x}$ and $\vec{y}$, and $\vec{\theta}$ with respect to time. Examples of possible graphs which flight path manager 922 and control variable manager 924 may output based on $\vec{x}$ and $\vec{y}$, and $\vec{\theta}$ are shown in greater detail above with reference to FIGS. 3A-5B.

In some embodiments, since solver 918 solves a boundary condition differential equation problem, an initial solution estimate must be provided to solver 918. Memory 906 is shown to include initial solution estimator 936, according to some embodiments. In some embodiments, initial solution estimator 936 is configured to determine an initial solution estimate and provide the initial solution estimate to solver 918. In some embodiments, the initial solution estimate facilitates convergence of solver 918. In some embodiments, initial solution estimator 936 first uses an estimate of $t_f$, $t_{f,estimate}$. In some embodiments, $t_{f,estimate}$ is a non-dimensional time value. In some embodiments, initial solution estimator 936 determines a non-dimensional time vector $\tau_{vec}$. In some embodiments, initial solution estimator 936 uses a function shown in equation (50) below:

$$\text{Initial Solution Estimate} = f_{estimate}(\tau_{vec}, A_{init}, t_{f,estimate}) \quad (50)$$

where $A_{init}$ is a vector including $x_0$, $y_0$, $\lambda_1 = -1$, and $\lambda_2 = -1$, and $f_{estimate}$ is a function which determines an initial solution estimate based on $\tau_{vec}$, $A_{init}$, and $t_{f,estimate}$. In some embodiments, $t_{f,estimate}$ is initially selected to be 50. In some embodiments, if solver 918 fails to converge, initial solution estimator 936 increases $t_{f,estimate}$ by a predetermined amount, and provides the new initial solution estimate to solver 918. In some embodiments, for complex cases (e.g., the case as shown in FIGS. 5A-5B), initial solution estimator 936 must repeatedly increase $t_{f,estimate}$ until solver 918 converges upon a solution. In some embodiments, initial solution estimator 936 is configured to continually increment $t_{f,estimate}$ until solver 918 converges. In some embodiments, initial solution estimator 936 is configured to automatically detect if solver 918 cannot converge. For example, in some embodiments, if after some predetermined number of increments of $t_{f,estimate}$, solver 918 still cannot converge, initial solution estimator 936 is configured to determine that a solution is not possible. In some embodiments, initial solution estimator 936 is configured to continually increment $t_{f,estimate}$ and provide solver 918 with the updated initial solution estimates until either solver 918 converges, or until initial solution estimator 936 has ran for a predetermined amount of time (e.g., 10 seconds).

Referring still to FIG. 9, flight path manager 922 and control variable manager 924 are configured to receive point data and $t_f$ from post solution manager 920, according to some embodiments. In some embodiments, flight path manager 922 is configured to provide user interface 930 and/or FMS 932 with flight path point data. In some embodiments, control variable manager 924 is configured to provide user interface 930 and/or FMS 932 with control variable point data. In some embodiments, FMS 932 layers a graph of the point data received from flight path manager 922 and/or control variable manager 924. For example, FMS 932 may display a map of surrounding terrain, with an overlayed graph of the flight path as determined by solver 918 and/or a graph of the control variable as determined by solver 918. In some embodiments, user interface 930 is any other device of aircraft 102 configured to display visual and/or textual information (e.g., a HUD). In some embodiments, user interface 930 and/or FMS 932 are configured to display control variable information to a user (e.g., a pilot). In some embodiments, user interface 930 and/or FMS 932 are configured to display a present value (e.g., based on location of aircraft 102) of the control variable as determined by solver 918. In some embodiments, this facilitates notifying a user (e.g., the pilot) of a turn angle of aircraft 102 which should be performed at a current location or a current point in time. In some embodiments, for example, FMS 932 initiates control variable display in response to determining that aircraft 102 is near an initial flight path point data. For example, once aircraft 102 reaches the starting point, FMS 932 and/or user interface 930 display the control variable which the pilot should use.

In some embodiments, FMS 932 updates a flight plan of aircraft 102 to include the flight path point data as determined by flight path controller 900. In some embodiments, FMS 932 uses the flight plan to perform an auto-pilot feature to automatically cause aircraft 102 to travel along the flight plan which includes the flight path point data as determined by flight path controller 900. In some embodiments, FMS 932 adjusts an operation of a current value of the steering angle of aircraft 102 such that it matches the control variable as determined by flight path controller 900 at the appropriate location/time.

While several examples of uses of flight path point data and/or control variable point data are described herein, it should be noted that flight path point data and/or control variable point data and/or the solution as determined by solver 918 are used for other purposes, according to some embodiments. In some embodiments, any of the outputs of post solution manager 920, solver 918, flight path manager 922, and control variable manager 924 are output to a remote device/system 934 via a wireless radio (e.g., a cellular dongle, a wireless transceiver, a wirelessly communicable device, etc.). In some embodiments, remote device/system 934 may use any of the outputs of post solution manager 920, solver 918, flight path manager 922, and control variable manager 924 for further analysis, reporting, decision making, etc. In some embodiments, remote device/system 934 is Air Traffic Control (ATC). In some embodiments, remote device/system 934 is configured to provide any of the output information of post solution manager 920, solver 918, flight path manager 922, and control variable manager 924 to another remotely situated user. For example, if an aircraft company needs to know a path which aircraft 102 will use to avoid a storm (e.g., vortex 104), wireless radio 928 may provide the aircraft company with the path which aircraft 102 will use to avoid the storm. In some embodiments, remote device/system 934 is configured to perform any of the functionality of flight path controller 900 and provide FMS 932 and/or user interface 930 with any of the outputs of post solution manager 920, solver 918, flight path manager 922, and control variable manager 924. For example, in some embodiments, remote device/system 934 is configured to perform any of the operations of flight path controller 900 and provide aircraft 102 (e.g., via FMS 932, a wireless radio of aircraft 102, etc.) with a flight path to take and control variable values to achieve the flight path.

In some embodiments, remote device/system 934 is configured to check the solution of solver 918 to ensure that the solution is correct. For example, remote device/system 934 may implement any number of safety features to ensure that aircraft 102 is not dangerously close to the storm (e.g., vortex 104), is not travelling too fast, will not fly through no-fly zones, etc. In some embodiments, remote device/system 934 is configured to determine an alternate flight path and control variable values to achieve the alternate flight path based on the solution determined by solver 918, by adjusting one or more inputs to solver 918, and using any of the functionality of flight path controller 900. In some embodiment, remote device/system 934 is configured to provide flight path controller 900 with safety constraints.

Method

Figure 10:
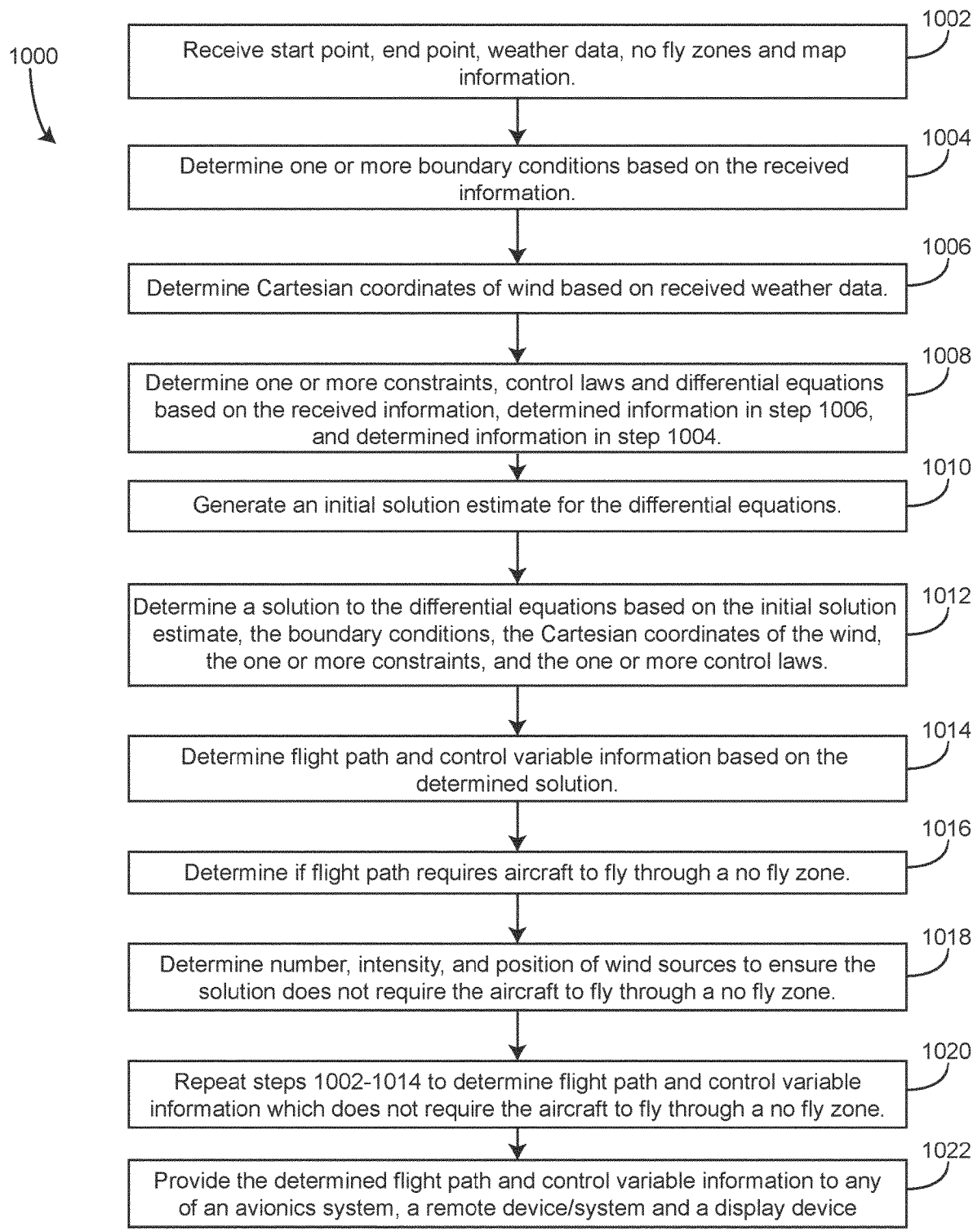
FIG. 10 is a block diagram of a method of determining a flight path around one or more vortices which minimizes a time for an aircraft to fly from a starting point to an ending point, according to some embodiments.

Referring now to FIG. 10, method 1000 shows a process for determining an optimal flight path for an aircraft approaching a storm, according to some embodiments. Method 1000 includes steps 1002-1022, according to some embodiments. In some embodiments, steps 1002-1022 are performed by flight path controller 900.

Method 1000 includes receiving start point information, end point information, weather/storm data, no-fly zones, and map information (step 1002), according to some embodiments. In some embodiments, the start point information, end point information weather/storm data, no-fly zones and map information are received by flight path controller 900. In some embodiments, flight path controller 900 receives the start point information and end point information from a user interface (e.g., user interface 930) or an avionics system (e.g., FMS 932). In some embodiments, the start point information is or includes $x_0$ and $y_0$. In some embodiments, the end point information is or includes $x_f$ and $y_f$. In some embodiments, boundary condition generator 912 receives the start point information and the end point information. In some embodiments, the weather data is received by flight path controller 900 from a weather service (e.g., a radar device/system, a weather alert, etc.). In some embodiments, the weather data is received by windspeed manager 910. In some embodiments, the weather data is or includes $x_{c,i}$, $y_{c,i}$, n, and $\Gamma$. In some embodiments, the no-fly zones are received by flight path controller 900. In some embodiments, the no-fly zones are received by re-router application 914. In some embodiments, the no-fly zones are received from a database, a system, or an obstacle detection system (e.g., radar). In some embodiments, the no-fly zones are or include information regarding an area of no-fly zones in Cartesian coordinates. In some embodiments, the map information is received by flight path controller 900.

Method 1000 includes determining one or more boundary conditions based on the received information (step 1004), according to some embodiments. In some embodiments, step 1004 is performed by problem framework manager 908. In some embodiments, step 1004 is performed by boundary condition generator 912. In some embodiments, the one or more boundary conditions are or include $x_0$, $y_0$, $x_f$ and $y_f$. In some embodiments, the one or more boundary conditions are or include $t_0$ and $H_f$.

Method 1000 includes determining Cartesian coordinates of wind based on received weather data (step 1006), according to some embodiments. In some embodiments, step 1006 is performed by windspeed manager 910. In some embodiments, step 1006 includes determining u(x, y) and v(x, y). In some embodiments, step 1006 includes determining OtherWind(x) and OtherWind(y). In some embodiments, step 1006 includes determining u(x, y, deriv) and v(x, y, deriv). In some embodiments, step 1006 includes determining X and Y Cartesian components of one or more storms, winds, vortices, etc.

Method 1000 includes determining one or more constraints, control laws, and differential equations based on the received information and the information determined in steps 1004-1006 (step 1008), according to some embodiments. In some embodiments, step 1008 includes determining $\dot{x}$, $\dot{y}$, $\dot{\lambda}_1$, $\dot{\lambda}_2$, $\lambda_1$, and $\lambda_2$. In some embodiments, step 1008 includes determining a sign of $\lambda_1$ and $\lambda_2$. In some embodiments, step 1008 includes using Lagrangian multipliers, Zermelo's Theorem, the Transversality Condition, and Hamiltonian mechanics according to the methods and functionality described hereinabove. In some embodiments, step 1008 is performed by problem framework manager 908. In some embodiments, step 1008 is performed by differential equation generator 916. In some embodiments, the differential equations are an optimization problem, where the solution determines flight path and control variable information to minimize an amount of time for aircraft 102 to travel from the starting point to the ending point.

Method 1000 includes generating an initial solution estimate for the differential equations (step 1010), according to some embodiments. In some embodiments, step 1010 includes generating $t_{f,estimate}$. In some embodiments, step 1010 is performed by initial solution estimator 936. In some embodiments, step 1010 includes using any of a dimensionless time vector, $x_0$, $y_0$, $\lambda_1 = -1$, and $\lambda_2 = -1$ to determine $t_{f,estimate}$.

Method 1000 includes determining a solution to the differential equations (e.g., the optimization problem as determined in step 1008) based on the initial solution estimate (as determined in step 1010), the boundary conditions (as determined in step 1004), the Cartesian coordinates of the wind (as determined in step 1006), the one or more constraints (as determined in step 1008), and the one or more control laws (as determined in step 1010) (step 1012), according to some embodiments. In some embodiments, step 1012 is performed by solver 918. In some embodiments, step 1012 is performed using the three-stage Lobatto IIIa formula. In some embodiments, step 1012 includes determining a solution to $\dot{x}$, $\dot{y}$, and $\dot{\lambda}_1$, $\dot{\lambda}_2$, or $\dot{x}$, $\dot{y}$ and $\lambda_1$, $\lambda_2$. In some embodiments, if step 1012 does not result in a solution (i.e., solver 918 does not converge), steps 1010 and 1012 are repeated with incrementally increasing $t_{f,estimate}$ until step 1012 results in a solution (i.e., solver 918 converges). In some embodiments, the solution results in a minimization of $t_f$. In some embodiments, the solution is a continuous solution with a continuous first derivative.

Method 1000 includes determining flight path and control variable information (step 1014) based on the determined solution (the solution of step 1012), according to some embodiments. In some embodiments, step 1014 is performed by flight path manager 922 and control variable manager 924. In some embodiments, step 1014 is performed by post solution manager 920. In some embodiments, step 1014 includes evaluating the solution for multiple non-dimensional time values. In some embodiments, step 1014 includes determining flight path and control variable point data using the solution as found in step 1012. In some embodiments, step 1014 includes determining vector $\vec{x}$, vector $\vec{y}$, vector $\vec{\lambda}_1$, vector $\vec{\lambda}_2$ and vector $\vec{t}$. In some embodiments step 1014 includes determining 4. In some embodiments, step 1014 includes dimensionalizing flight path and control variable data.

Method 1000 includes determining if the flight path (as determined in steps 1012-1014) requires aircraft 102 to fly through a no-fly zone (step 1016), according to some embodiments. In some embodiments, step 1016 is performed by re-router application 914. In some embodiments, if the flight path as determined by solver 918 requires aircraft 102 to fly through a no-fly zone, method 1000 proceeds to step 1018. In some embodiments, if the flight path as determined by solver 918 does not require aircraft 102 to fly through a no-fly zone, method 1000 proceeds to step 1022.

Method 1000 includes determining a number, intensity, and position of wind sources to ensure that the solution does not require aircraft 102 to fly through a no-fly zone (step 1018), according to some embodiments. In some embodiments, step 1018 is performed by re-router application 914. In some embodiments, the wind sources ensure that the solution determine by solver 918 does not require aircraft 102 to fly through a no-fly zone.

Method 1000 includes repeating steps 1002-1014 to determine flight path and control variable information which does not require the aircraft to fly through a no-fly zone (step 1020), according to some embodiments. In some embodiments, steps 1002-1014 are repeated taking into account the wind sources (e.g., updating u(x, y) and v(x, y) with windspeed manager 910). In some embodiments, if after a first update of u(x, y) and v(x, y) to account for wind sources, the flight path and control variable information still require the aircraft to fly through the no-fly zone, any of the number, position, and intensity of the wind sources are adjusted (e.g., intensity is increased), and step 1020 is repeated. In some embodiments, step 1020 is repeated until the flight path and control variable information do not require aircraft 102 to fly through the no-fly zone.

Method 1000 includes (step 1022) providing the determined flight path and control variable information to any of an avionics system (e.g., FMS 932), a remote device/system (e.g., remote device/system 934), and a display device (e.g., user interface 930), according to some embodiments. In some embodiments, step 1022 includes graphing any of the flight path and control variable information and providing it to any of the avionics system, the remote device/system, and the display device. In some embodiments, step 1022 includes layering the graphed flight path and/or control variable information onto a map (e.g., at FMS 932). In some embodiments, step 1022 includes automatically adjusting an operation of aircraft 102 to follow (e.g., fly along) the determined flight path using the determined control variable information. In some embodiments, step 1022 includes providing the flight path information and/or control variable information to FMS 932 for use of either displaying to a user (e.g., the pilot), or for use in an autopilot application.

Example Code

Referring now to FIGS. 11A-14, various sections of MATLAB® code which flight path controller 900 uses are shown, according to some embodiments. Any of the code shown in FIGS. 11A-14 is performed by various components of flight path controller 900, according to some embodiments.

Figure 11B:
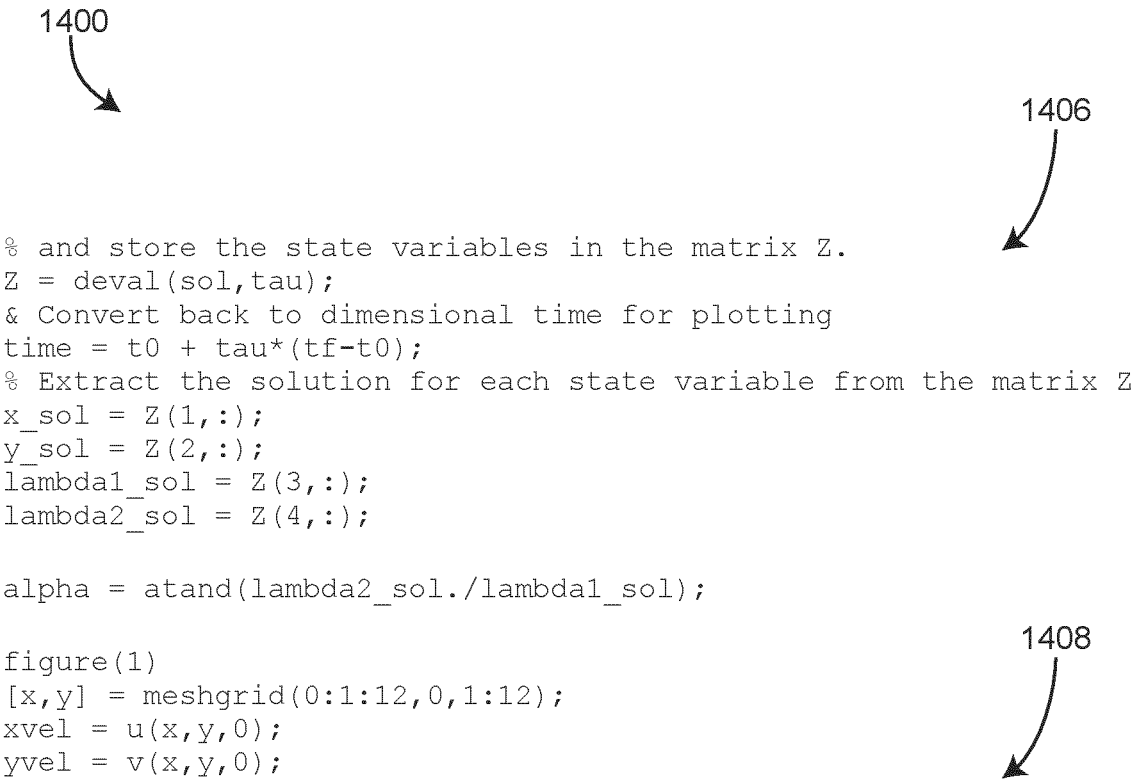

FIG. 11A-B show a main script 1400 which is used by flight path controller 900, according to some embodiments. Script 1400 includes section 1402 which defines various values (e.g., $x_0$, $y_0$, $x_f$, $y_f$, $H_f$, and V), according to some embodiments. In some embodiments, problem framework manager 908 is configured to receive any of the various values (e.g., $x_0$, $y_0$, $x_f$, $y_f$, $H_f$, and V) as shown in section 1402.

Script 1400 includes initial guess section 1404, according to some embodiments. In some embodiments, initial guess section 1404 shows code for determining the initial solution estimate. In some embodiments, initial guess section 1404 is performed by initial solution estimator 936.

Script 1400 includes solution section 1406, according to some embodiments. In some embodiments, solution section 1406 includes using MATLAB®'s bvp4 c function to determine a solution for the project_odes_tf function ($\dot{x}$, $\dot{y}$, $\dot{\lambda}_1$, and $\dot{\lambda}_2$). In some embodiments, solution section 1406 is performed by solver 918.

Script 1400 includes evaluation section 1406 as shown in FIG. 11B, according to some embodiments. In some embodiments, evaluation section 1406 includes using MATLAB®'s deval function to evaluation the solution as determined in solution section 1406. In some embodiments, evaluation section 1406 is performed by post solution manager 920.

Script 1400 includes graphing section 1408 as shown in FIG. 11B, according to some embodiments. In some embodiments, graphing section 1408 includes graphing the evaluations as determined by evaluation section 1406. In some embodiments, graphing section 1408 is performed by flight path manager 922 and/or control variable manager 924.

Referring now to FIG. 12, function 1500 is shown, according to some embodiments. In some embodiments, function 1500 is a function for determining project_odes_tf as used by solution section 1406. In some embodiments, function 1500 determines project_odes_tf based on $\vec{\tau}$, x, y, $\lambda_1$, and $\lambda_2$. In some embodiments, function 1500 determines $\dot{x}$, $\dot{y}$, $\dot{\lambda}_1$, and $\dot{\lambda}_2$ (xdot, ydot, lambda_1_dot, lambda_2_dot) using equations (13), (14), (44), and (45), respectively. In some embodiments, function 1500 uses equations (46) and (47) or equations similar to equations (46) and (47) to non-dimensionalize $\dot{x}$, $\dot{y}$, $\dot{\lambda}_1$, and $\dot{\lambda}_2$ to determine dX_dtau (project_odes_tf). In some embodiments, function 1500 is performed by differential equation generator 916.

Referring now to FIG. 13, function 1600 is shown, according to some embodiments. In some embodiments, function 1600 is a boundary condition function. In some embodiments, function 1600 is performed by boundary condition generator 912. Function 1600 determines boundary conditions based on Y0, Yf, and tf, according to some embodiments. In some embodiments, function 1600 determines a first initial condition ($x_0$), a second initial condition ($y_0$), a first final condition ($x_f$), a second final condition ($y_f$) and the final Hamiltonian ($H_f$) as boundary conditions. In some embodiments, solution section 1406 uses function 1600 in MATLAB®'s bvp4c function to determine the solution.

Figure 15:
FIG. 15 shows changes to the MATLAB® code of FIGS. 11A-B to account for multiple vortices, according to some embodiments.

Referring now to FIG. 14, functions 1700 and 1800 are shown, according to some embodiments. In some embodiments, functions 1700 and 1800 are functions to determine X-wind velocity components and Y-wind velocity components. In some embodiments, functions 1700 and 1800 are performed by windspeed manager 910. In some embodiments, functions 1700 and 1800 are used to determine u(x, y, deriv) and v(x, y, deriv). In some embodiments, functions 1700 and 1800 are used in function 1500 and function 1600 to determine and Referring now to FIGS. 15-17, changes 1900 to script 1400, changes 2000 to function 1500, changes 2100 to function 1700, and changes 2200 to function 1800 are shown, according to some embodiments. In some embodiments, FIGS. 15-17 show changes or additions to script 1400, function 1500, function 1700, and function 1800 to account for the case when two vortices 104 are present.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A controller for an aircraft, the controller configured to:
receive a starting point, a desired ending point, an initial time, a current aircraft speed, a first wind vortex strength, a first position of a first wind vortex, a second wind vortex strength, and a second position of a second wind vortex;
determine components of wind speed of the first wind vortex, the second wind vortex, a wind source, and a uni-directional wind;
determine one or more boundary conditions for a boundary value optimization problem;
determine an initial estimate for the boundary value optimization problem;
define the boundary value optimization problem as one or more differential equations based on the starting point, the desired ending point, the initial time, the current aircraft speed, the components of the wind speed, and a control variable of the aircraft;
determine a solution for the boundary value optimization problem based on the one or more boundary conditions, the one or more differential equations and the initial estimate, wherein determining the solution utilizes a first tailwind of the first vortex and a second tailwind of the second vortex to minimize an amount of time to travel between the starting point and the desired ending point;
evaluate the solution to determine a flight path and control variable values for the flight path;
at least one of: provide a display representing the determined flight path and the control variable values to a user; and adjust an operation of the aircraft to use the control variable values to follow the determined flight path;
identify if the determined flight path crosses a no-fly zone;
place one or more wind sources at or around the no-fly zone;
incrementally increase a strength of the one or more wind sources in increments of the strength;
determine, for each of the increments of the strength, whether the flight path crosses the no-fly zone; and
for each of the increments of the strength, re-determine components of wind speed, re-define the boundary value optimization problem, re-determine the solution, and re-evaluate the solution in response to identifying that the determined flight path crosses the no-fly zone.

2. The controller of claim 1, wherein the one or more boundary conditions comprise coordinates of the initial starting point, coordinates of the desired ending point, an initial time value, and a final Hamiltonian value.

3. The controller of claim 1, wherein the controller is further configured to determine Cartesian components of the first wind vortex, the second wind vortex, the wind source, and the uni-directional wind.

4. The controller of claim 1, wherein the controller is configured to determine the solution for the boundary value optimization problem using a three-stage Lobatto IIIa solver.

5. The controller of claim 1, wherein the controller is configured to determine the final value of the Hamiltonian based on a transversality condition.

6. The controller of claim 1, wherein the one or more differential equations comprise a differential equation of a co-state variable in an x direction, a differential equation of a co-state variable in a y direction, a differential equation of a rate of change of a first Lagrange multiplier, and a differential equation of a rate of change of a second Lagrange multiplier.

7. The controller of claim 1, wherein the controller is further configured to cause a display device to display a graph of at least one of the determined flight path and the control variable values of the determined flight path.

8. The controller of claim 1, wherein the control variable is a steering angle of the aircraft.

9. A method for determining a flight path around a first wind vortex and a second wind vortex, and controlling an aircraft to follow the flight path, the method comprising:
receiving a starting point, a desired ending point, an initial time, and a current aircraft speed;
determining components of wind speed of a first wind vortex and a second wind vortex;
determining one or more boundary conditions for an optimization problem;
determining an initial estimate for the optimization problem;
defining the optimization problem as one or more differential equations based on the starting point, the desired ending point, the initial time, the current aircraft speed, the components of the wind speed, and a control variable of the aircraft;
determining a solution for the optimization problem based on the one or more boundary conditions, the one or more differential equations, and the initial estimate, wherein determining the solution utilizes a first tailwind of the first vortex and a second tailwind of the second vortex to minimize an amount of time to travel between the starting point and the desired ending point;
evaluating the solution to determine a flight path and control variable values for the flight path;
adjusting an operation of the control variable of the aircraft to cause the aircraft to follow the determined flight path;
identifying if the determined flight path crosses a no-fly zone;
placing one or more wind sources at or around the no-fly zone;
incrementally increasing a strength of the one or more wind sources in increments of the strength;
determining, for each of the increments of the strength, whether the flight path crosses the no-fly zone; and
for each of the increments of the strength, re-determining components of wind speed, re-defining the optimization problem, re-determining the solution, and re-evaluating the solution in response to identifying that the determined flight path crosses the no-fly zone.

10. The method of claim 9, wherein the one or more boundary conditions comprise coordinates of the initial starting point, coordinates of the desired ending point, an initial time value, and a final Hamiltonian value.

11. The method of claim 9, wherein determining components of wind speed of the first wind vortex, the second wind vortex, the wind source, and the uni-directional wind comprises determining Cartesian components of wind speed of the wind vortex, the second wind vortex, the wind source, and the uni-directional wind.

12. The method of claim 9, further comprising determining the solution for the optimization problem using a three-stage Lobatto IIIa solver.

13. The method of claim 9, wherein the optimization problem is a boundary value optimization problem.

14. The method of claim 9, wherein the one or more differential equations comprise a differential equation of a co-state variable in an x direction, a differential equation of a co-state variable in a y direction, a differential equation of a rate of change of a first Lagrange multiplier, and a differential equation of a rate of change of a second Lagrange multiplier.

15. The method of claim 9, further comprising causing a display device to display a graph of at least one of the determined flight path and the control variable values of the determined flight path.

* * * * *